(12) United States Patent
Nygren et al.

(10) Patent No.: US 12,073,658 B2
(45) Date of Patent: Aug. 27, 2024

(54) AGRICULTURE OPERATION MONITORING SYSTEM AND MONITORING METHOD

(71) Applicant: ÅLÖ AB, Umeå (SE)

(72) Inventors: Tomas Nygren, Umeå (SE); Gustaf Lagunoff, Umeå (SE)

(73) Assignee: ÅLÖ AB, Umeå (SE)

( * ) Notice: Subject to any disclaimer, the term of this patent is extended or adjusted under 35 U.S.C. 154(b) by 599 days.

(21) Appl. No.: 16/380,080

(22) Filed: Apr. 10, 2019

(65) Prior Publication Data

US 2019/0378354 A1 Dec. 12, 2019

Related U.S. Application Data

(63) Continuation of application No. PCT/SE2017/050995, filed on Oct. 10, 2017.

(51) Int. Cl.
*G07C 5/00* (2006.01)
*A01B 63/10* (2006.01)
(Continued)

(52) U.S. Cl.
CPC .............. *G07C 5/006* (2013.01); *A01B 63/10* (2013.01); *A01B 79/005* (2013.01); *G07C 5/08* (2013.01); *H04L 67/12* (2013.01); *H04W 4/38* (2018.02)

(58) Field of Classification Search
None
See application file for complete search history.

(56) References Cited

U.S. PATENT DOCUMENTS

| 5,957,213 A * | 9/1999 | Loraas | ...................... E02F 3/96 37/302 |
|---|---|---|---|
| 2008/0086320 A1* | 4/2008 | Ballew | ................... G06Q 10/00 705/342 |

(Continued)

FOREIGN PATENT DOCUMENTS

| EP | 0866177 A2 | 9/1998 |
|---|---|---|
| EP | 2957679 A1 | 12/2015 |

(Continued)

OTHER PUBLICATIONS

International Search Report and Written Opinion for PCT/SE2017/050995, dated Dec. 20, 2017, 22 pages.

*Primary Examiner* — Adam D Tissot
*Assistant Examiner* — Garrett F Evans
(74) *Attorney, Agent, or Firm* — Dinsmore & Shohl LLP

(57) ABSTRACT

The present disclosure relates to an agriculture operation monitoring system comprises at least one implement adapted to be mounted to a work vehicle, a wireless communication element, and a data storage and processing system. The implement comprises one or a plurality of sensors arranged to obtain sensor signals related to at least one hydraulic function of the implement and a local control element. The local control element is arranged to receive sensor signals obtained by the at least one sensor, to determine at least one present setting related to an operational status of the implement based on the received sensor signals and to feed a status message related to the present setting to the wireless communication element. The wireless communication element is arranged to transmit the status message to the data storage and processing system or to at least one electronic user device.

22 Claims, 13 Drawing Sheets

(51) Int. Cl.
*A01B 79/00* (2006.01)
*G07C 5/08* (2006.01)
*H04L 67/12* (2022.01)
*H04W 4/38* (2018.01)

(56) References Cited

U.S. PATENT DOCUMENTS

| | | | |
|---|---|---|---|
| 2008/0088107 A1* | 4/2008 | Bitter | B60G 21/073 280/124.161 |
| 2008/0100017 A1* | 5/2008 | Bitter | B60G 17/005 280/124.16 |
| 2009/0216412 A1 | 8/2009 | Mindeman et al. | |
| 2010/0006789 A1* | 1/2010 | Maezawa | F16K 35/022 251/98 |
| 2010/0102974 A1* | 4/2010 | Keast | F15B 19/005 340/626 |
| 2012/0253744 A1* | 10/2012 | Schmidt | G07C 5/008 702/182 |
| 2013/0274925 A1* | 10/2013 | Oates, Jr. | E02F 9/267 700/275 |
| 2015/0234767 A1* | 8/2015 | Tatge | G06Q 10/06 710/306 |
| 2016/0131164 A1* | 5/2016 | Carpenter | F15B 19/005 92/261 |
| 2017/0344922 A1* | 11/2017 | Sauder | G06F 3/0488 |
| 2017/0354080 A1* | 12/2017 | Foster | G05D 1/0016 |
| 2018/0051442 A1* | 2/2018 | Igarashi | E02F 9/2025 |

FOREIGN PATENT DOCUMENTS

| | | |
|---|---|---|
| WO | 2013020856 A2 | 2/2013 |
| WO | 2015038751 A1 | 3/2015 |

* cited by examiner

Figure 5

| Implement ID |
|---|
| 12345 |

56

57

| Service event type | Monitoring | Threshold type | Threshold setting $W_T$ |
|---|---|---|---|
| Hydraulic accumulator maintenance | Yes | Calendar time | 400 days |
| Hydraulic accumulator replacement | Yes | Pressure cycle count 1 | 1000 |
| Hose replacement/ maintenance/inspection | No | Pressure cycle count 1<br>Time in motion count 1<br>Calendar time | 500<br>100<br>400 days |
| Replacement/maintenance/inspection arm | Yes | Pressure cycle count 1<br>Calendar time | 3000<br>400 days |
| Replacement/maintenance/inspection fastener | Yes | Pressure cycle count 1<br>Time in motion count 1<br>Calendar time | 500<br>1000h<br>400 days |
| Replacement/maintenance/inspection bearing box | No | Pressure cycle count 1<br>Time in motion count 1<br>Calendar time | 500<br>1000h<br>400 days |
| Replacement/maintenance bearing | Yes | Time in motion count 1 | 1000h |

Figure 6

| Implement ID |
|---|
| 12345 |

56

57

| Operations | Operational values |
|---|---|
| Pressure cycle count 1 | 13000 |
| Pressure cycle count 2 | 1500 |
| Time in motion count 1 | 1100h |
| Time in motion count 2 | 1500h |
| Power time | 9000h |
| Calendar time | 1300 days |

| Implement ID |
|---|
| 12345 |

56

63 64

| Operations | Operational values |
|---|---|
| Pressure cycle count 1 | 13000 |
| Pressure cycle count 2 | 1500 |
| Time in motion count 1 | 1100h |
| Time in motion count 2 | 1500h |
| Power time | 9000h |
| Calendar time | 1300 days |

58  61  62  65  66  67

| Service event type | Threshold type | Threshold setting $W_T$ | Last service $W_{LS}$ | Present setting $W_{PS}$ | SP |
|---|---|---|---|---|---|
| Hydraulic accumulator maintenance | Calendar time | 400 days | 1200 days | 1300 days | 25 |
| Hydraulic accumulator replacement | Pressure cycle count 1 | 1000 | 12300 | 13000 | 70 |
| Replacement/maintenance/inspection arm | Pressure cycle count 1<br>Calendar time | 3000<br>400 days | 10000<br>600 days | 13000<br>1000 days | 100<br>100 |
| Replacement/maintenance/inspection fastener | Pressure cycle count 1<br>Time in motion count 1<br>Calendar time | 500<br>1000h<br>400 days | 12750<br>1000h<br>1200 days | 13000<br>1100h<br>1300 days | 50<br>10<br>25 |
| Replacement/maintenance bearing | Time in motion count 1 | 1000h | 1000h | 1850h | 85 |

68  69

| Status Indicator | Attribute |
|---|---|
| Replacement/maintenance/inspection arm | Due 100% |
| Replacement/maintenance bearing | Alert 85% |

Figure 7b

Implement ID ~56
12345

57

58  73      61  71  72

| Service history | | | |
|---|---|---|---|
| Service event type | Threshold type | Dates of service | Settings at service $W_{ls}$ |
| Hydraulic accumulator maintenance | Calendar time | Xx.yy.zz/ xx.yy.zz/ xx.yy.zz | 398 833 1200 days |
| Hydraulic accumulator replacement | Pressure cycle count 1 | Xx.yy.zz/ xx.yy.zz/ xx.yy.zz ... | .... .. 12300 |
| Replacement/maintenance/inspection arm | Pressure cycle count 1 Calendar time | Xx.yy.zz/ xx.yy.zz/ xx.yy.zz ... | .. .. 10000 /600 days |
| Replacement/maintenance/inspection fastener | Pressure cycle count 1 Time in motion count 1 Calendar time | Xx.yy.zz/ xx.yy.zz/ xx.yy.zz ... | ... 12750 /1000h /1200 days |
| Replacement/maintenance bearing | Time in motion count 1 | xx.yy.zz | 1000h |

AGRICULTURE OPERATION MONITORING SYSTEM AND MONITORING METHOD

RELATED APPLICATIONS

The present application is a continuation of PCT Application No. PCT/SE2017/050995 filed Oct. 10, 2017, which claims priority to Swedish Application No. SE 1600283-4, filed Oct. 10, 2016, and Swedish Application No. SE 1600292-5, filed Oct. 13, 2016, all of which are hereby incorporated in their entirety by reference as set forth herein.

TECHNICAL FIELD

The present disclosure relates to an agriculture operation monitoring system comprising at least one implement adapted to be mounted to a work vehicle.

The present disclosure further relates to a method for agriculture operation monitoring, which method provides status messages.

TECHNICAL BACKGROUND

Agriculture vehicles, such as tractors may be provided with a front loader. Operation of this front loader is controlled from the cabin of the tractor. For example an operator at the cabin of the tractor controls lifting and lowering of the loader and movement of a tool attached to the loader. The lifting and lowering of the loader may be performed by means of a first hydraulic circuit and movement of the attachment is characteristically performed by means of a hydraulic circuit controlled from the tractor.

WO 2013/020856 discloses an implement for attachment to a vehicle, wherein a first hydraulic circuit for control at the front loader is connectable to a control valve at the tractor. The control valve (and switch means) is controlled by a tractor control unit in the tractor to regulate fluid flow through the first hydraulic circuit.

WO 2010/062329 relates to diagnostic and response systems and methods for a fluid power system.

SUMMARY

The present disclosure relates to an agriculture operation monitoring system. The agriculture operation monitoring system comprises at least one implement adapted to be mounted at a work vehicle. The implement has at least one sensor arranged to obtain sensor signals related to at least one hydraulic function of the implement and a local control element. The agriculture operation monitoring system comprises further a wireless communication element. The agriculture operation monitoring system comprises further a data storage and processing system. The local control element is arranged to receive sensor signals obtained by the at least one sensor, to determine at least one present setting related to an operational status of the implement based on the received sensor signals and to feed a status message related to the present setting to the wireless communication element. The wireless communication element is arranged to transmit the status message related to the present setting to the data storage and processing system or to at least one electronic user device.

The present setting related to the operational status of the implement forms a service indicator related to service operations available at the data storage and processing system. The local control element can locally continuously determine the present setting. The status message related to the present setting is fed to the data storage and processing system or electronic user device.

In one option, the status message comprises the determined present setting and the implement ID.

The data storage and processing system or electronic user device may then be arranged to determine a state parameter indicative of the status in relation to when service/maintenance/inspection is due. The state parameter is determined based on the present setting and a threshold setting and possibly a setting at last service.

The data storage and processing system or electronic user device may then further be arranged determine when the state parameter reaches a predetermined level, and to generate a status indicator indicative of that it is time for maintenance/service inspection.

In one option, the local control element determines the state parameter and accordingly, the status message may comprise the state parameter and possibly implement ID. The data storage and processing system and/or electronic user device may then be arranged to generate the status indicator indicative of that it is time for maintenance/service inspection.

In one option, the local control element is arranged to determine also the status indicator. The local control element is then arranged to transmit the status indicator, when generated to the data storage and processing system and/or electronic user device.

Thus, the present setting is characteristically determined locally at each implement and the determined present settings or information originating therefrom may then be made available via the storage and processing system and/or the electronic user device.

This means that all data related to the operational status of one implement is always handled locally by that implement. Thereby it is secured that the data used for the present settings and consequently service indicators is related to that implement. Further, it is secured that the determination is made correctly as the implement characteristically knows its own characteristics.

If the wireless communication is not available for some reason, the status message may be communicated once the communication is up and running.

Further, all data related to the operational status of the implement may also be stored locally at the implement. Thus, the implement characteristically comprises a memory which stores this data. Thereby, all data related to the implement, including its operational history, may be present at the implement. The data can be inspected at any time. Another advantage is that as the data is stored at the implement and the entire operational history is available at the implement the data is not disrupted by for example sale of the implement. Instead, the data forms an integrated part of the implement.

In different embodiments, the agriculture operation monitoring system, the implement comprises at least one pressure sensor and/or at least one position or movement sensor and/or at least one timer connected to or arranged within the local control element. The position sensor may be an angular position sensor arranged at a pivot point. The movement sensor may be an angular movement sensor arranged at a pivot point.

Thus, the at least one sensor arranged to obtain sensor signals related to at least one hydraulic function of the implement may comprise at least one pressure sensor and/or at least one position or movement sensor. In addition or instead, the implement may be provided with the timer. The timer may be arranged to provide timer information to the local control element related to a calendar time and/or a time in motion and/or a power time. The power time timer may be arranged to provide timer information related to powering of the local control element.

The implement may comprise a front loader.

In different embodiments, the wireless communication element is arranged at the implement.

The wireless communication element is easy to mount at the implement. The mounting of the wireless communication at the implement provides a stand-alone solution wherein all equipment required for communicating with the data storage and processing system.

The wireless communication element may for example be integrated within the local control element. The wireless communication element may be arranged at a digital output of the local control element connected to the digital interface. The wireless communication element may be arranged at a separate output of the local control element. The wireless communication element may for example be integrated within the digital interface of the implement. The wireless communication element may be arranged at a communication bus between the digital output of the local control element and the digital interface.

In different embodiments, the implement comprises a digital interface connectable to a work vehicle having a corresponding digital interface and the wireless communication element may be adapted to be arranged at the work vehicle. The local control element and the wireless communication element are then adapted to communicate over the digital interface of the implement and the digital interface of the work vehicle.

Then the work vehicle possesses the determined present settings related to the operational status of the implement. If the work vehicle is a less modern vehicle without an access point, information related to the operational status of the implement is stored at the work vehicle. The information related to the operational status of the implement may then when appropriate be uploaded to the data storage and processing system.

When the work vehicle has the wireless communication element, as long as there is access, the status message may be transmitted to the data storage and processing system as soon as the work vehicle has received the data. If there is no access, for example is located at an unavailable location, the data received by the work vehicle can still be stored at the work vehicle and transmitted to the data storage and processing system once access has been established.

The wireless communication element may be arranged at the digital interface of the work vehicle to a corresponding digital interface of an implement. The wireless communication element may for example be integrated within the digital interface of the work vehicle.

The wireless communication element may be arranged at a communication bus connected to the digital interface.

The agriculture operation monitoring system as defined above may be used as decision support for maintaining a machinery park with regard to maintenance and service.

In different embodiments, the wireless communication element is arranged to communicate with the data storage and processing system over a communication network such as mobile cellular network and/or the internet.

In different embodiments, the wireless communication element is arranged to communicate with at least one electronic user device arranged to communicate with the data storage and processing system over a communication network.

The at least one electronic user device may comprise an electronic user device installed in the work vehicle. The at least one electronic user device may comprise an electronic user device carried by a farmer at the agriculture field. The at least one electronic user device may comprise an electronic user device used by management staff for example at an office location.

In accordance with at least some of these examples, the wireless communication element may be a short range communication element such as a Bluetooth chip.

The storage and processing system and/or the at least one electronic user device may be arranged to store the status message related to the operational status of the implement along with an identity of the implement.

Accordingly, the storage and processing system keeps track of service status for a plurality of identified implements.

The storage and processing system and/or the electronic user device and/or the local control element may have access to information related to at least one threshold setting and possibly a setting at last service and to determine a state parameter related to the operational status of the implement based on the present setting, the threshold setting and the setting at last service event. Thus, the storage and processing system is capable of handling implements each identified by their unique identity. Each implement may be associated to at least one threshold which is relevant for that particular implement. The at least one threshold may be tailored for the components used in that implement. The at least one threshold may be set at the manufacturer or service or garage site. The at least one threshold may be set at the electronic user device.

The storage and processing system and/or the electronic user device may be arranged to transmit the at least one threshold and/or information related to a last service event to the implement having the associated identity.

Thus, in accordance therewith, the at least one threshold is communicated to the local control element of the implement having the particular identity. Whenever the at least one threshold is updated, the storage and processing system may be arranged to communicate the updated threshold to the local control element of the implement having that particular identity. The same may apply for the information related to the last service event.

In different embodiments, the storage and processing system and/or the at least one electronic user device and/or the local control element is arranged to, for at least some of the implements, store historical information related to service events.

It will then be possible to follow up on the status of a particular implement or a group of implements. The historical information related to service events may be used for presenting when the latest service event took place. It may also be presented to which service type the latest service event belongs.

The storage and processing system and/or at least one electronic user device may be arranged to provide a status report related to a predefined implement or group of implements.

The entire service history for the specific implement or group of implements may also be presented. Such a service summary may for example be used for decision support related to an amount of time and/or costs are to be spent within a certain time period related to maintenance service. The service summary may also give at hand it may be advisable to completely remove some implement from use. Accordingly, an entire float of implements may be monitored.

The storage and processing system and/or the at least one electronic user device may be arranged to provide a status report related to a predefined type of service event.

Thereby the actual service or maintenance need can be monitored for example related to an entire machine park.

In different embodiments the local control element is arranged to determine the present settings based on a pressure cycle count.

In different embodiments, the local control element comprises or is connected to at least one timer. The local control element may be arranged to determine the present settings based on the time count.

The timer is for example arranged to determine a calendar time and/or a power time of the local control element and/or a time in motion count.

The calendar time relates to the calendar time since monitored components at the implement have been serviced or exchanged. The monitored components of the implement may for example include at least one structure element and/or a hydraulic accumulator of a suspension system and/or at least one bearing.

In different embodiments, the implement comprises a suspension system comprising a hydraulic accumulator. The local control element may then be arranged to form a hydraulic accumulator status indicator related to an operational status of the hydraulic accumulator.

The hydraulic accumulator present setting may comprise a hydraulic accumulator maintenance parameter related to maintenance of the hydraulic accumulator determined based on a time count. The maintenance of the hydraulic accumulator may involve recharging a gas pressure of the hydraulic accumulator.

The hydraulic accumulator present setting may instead or in addition thereto comprise a hydraulic accumulator service parameter related to replacement of the hydraulic accumulator based on a determined pressure cycle count.

In different embodiment, the local control element is arranged to determine a hose and/or a structure element present setting related to an operational status of at least one hose and/or structure element of the implement.

The at least one structure element may for example comprise an arm, a fastening element or a bearing box.

The term inspection includes a visual inspection for example for cracks in the structure element occurring due to fatigue of the material.

In different embodiments, the present setting related to operational status of the at least one structure element of the implement is determined based on a determined pressure cycle count and/or based on a time count.

For example, the present setting related to the operational status of at least one structure element of the implement may be based primarily on a pressure cycle count and secondarily on a calendar time. Especially in case the structure element is a loose movable part, such as a hose, the present settings may also be based on a time in motion count.

In different embodiment, the local control element is arranged to form a present setting related to operation status of at least one hose of the implement. The present setting related to the operational status of the at least one hose of the implement may be formed based on a determined pressure cycle count and/or based on the time count.

In different embodiments, the local control element is arranged to form a bearing present status related to of the operational status of at least one bearing of the implement.

The bearing present setting relating to maintenance of the at least one bearing may be formed based on of the time count related to the at least one bearing.

The present disclosure further relates to a data storage and processing system for use in an agricultural system as defined above.

The present disclosure further relates to an electronic user device for use in an agricultural system as defined above.

The electronic user device may be arranged to receive the status message.

In one option, the status message comprises the determined present setting and the implement ID.

The electronic user device may then be arranged to determine a state parameter indicative of the status in relation to when service/maintenance/inspection is due. The state parameter is determined based on the present setting and a threshold setting and possibly a setting at last service. The electronic user device may further be arranged determine when the state parameter reaches a predetermined level, and to generate a status indicator indicative of that it is time for maintenance/service inspection.

In one option, the local control element determines the state parameter and accordingly, the received status message may comprise the state parameter and possibly implement ID. The electronic user device may then be arranged to generate the status indicator indicative of that it is time for maintenance/service inspection.

In one option, the received status message comprises the status indicator.

The status indicator may form an alert for performing service or maintenance or inspection. The alert may be associated to a calendar function of the electronic user device for planning a service/maintenance/inspection. The electronic user device may be configured to allow a user to send a confirmation message to the data storage and processing system once the service/maintenance/inspection has been executed in response to the alert. The data storage and processing system may then be arranged to associate the service/maintenance/inspection confirmation to the corresponding status indicator in its memory. The confirmation message may further comprise a date for the service/maintenance/inspection. The date may be obtained from the calendar function of the electronic user device. The service/maintenance/inspection date may also be stored in the memory together with or as the service confirmation.

The present disclosure further relates to an implement for use in the system as defined above.

The implement may be arranged to download the information stored in the storage and processing system and/or the electronic user device related to that implement. Accordingly, the implement may be arranged to download information related to status indicators not remedied, remedied status indicators possibly along with date of remedy (service/maintenance/inspection). The implement may further be arranged to download the threshold(s) settings which are related to the operational status of that implement.

In accordance with this example, electronic user device may be arranged to communicate with the implement and/or with the data storage and processing system for obtaining the functionality of the electronic user device as discussed above. Thus, electronic user device may then be arranged to read the information related to status indicators not remedied, remedied status indicators possibly along with date of remedy (service/maintenance/inspection) from the implement instead of the data storage and processing system. The implement may further be arranged to update the information related to status indicators not remedied, remedied status indicators possibly along with date of remedy (service/maintenance/inspection). The implement may then be arranged to transmit the updates to the data storage and processing system.

This has the effect that the owner of the implement always has access to the data related to his/her implement.

The implement may be a front loader.

The present disclosure further relates to an implement having one or a plurality of sensors arranged to obtain sensor signals related to at least one hydraulic function of the implement and a local control element. The local control element is arranged to receive sensor signals obtained by the at least one sensor, to determine a present setting related to an operational status of the implement based on the received sensor signals and to feed a status message related to the present setting to a wireless communication element or to a digital interface of the implement. The present disclosure further relates to a work vehicle for use in the agriculture operation monitoring system as defined above. The work vehicle has a digital interface connectable to an implement.

The work vehicle comprises further the wireless communication element.

The wireless communication element may be arranged at the digital interface of the work vehicle to an implement, or a communication bus connected to the digital interface.

The wireless communication element may be arranged to communicate with the data storage and processing system over a mobile [cellular] communication network and/or the Internet.

The wireless communication element may be arranged to communicate with the at least one electronic user device arranged to communicate with the data storage and processing system over a communication network.

The present disclosure further relates to a method for monitoring agriculture operation monitoring. The monitoring comprises the steps of
obtaining sensor signals related to at least one hydraulic function of an implement; determining at a local control element mounted at the implement a present setting related to an operational status of the implement based on the received sensor signals; feeding a status message related to the present setting to a wireless communication element; and transmitting by means of the wireless communication element the status message to a data storage and processing system or to at least one electronic user device.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 5 illustrates examples of a part of contents of a storage comprising information related to operational status types which may be monitored.

FIG. 6 illustrates examples of a part of contents of a storage comprising information related to operational values of an implement.

FIG. 7a illustrates an example of a part of contents of a storage comprising information related to monitoring of operational status for performing service events of a particular implement.

FIG. 7b illustrates an example of a part of contents of a storage 57 comprising historical information related to performed service events.

DETAILED DESCRIPTION

Figure 1:
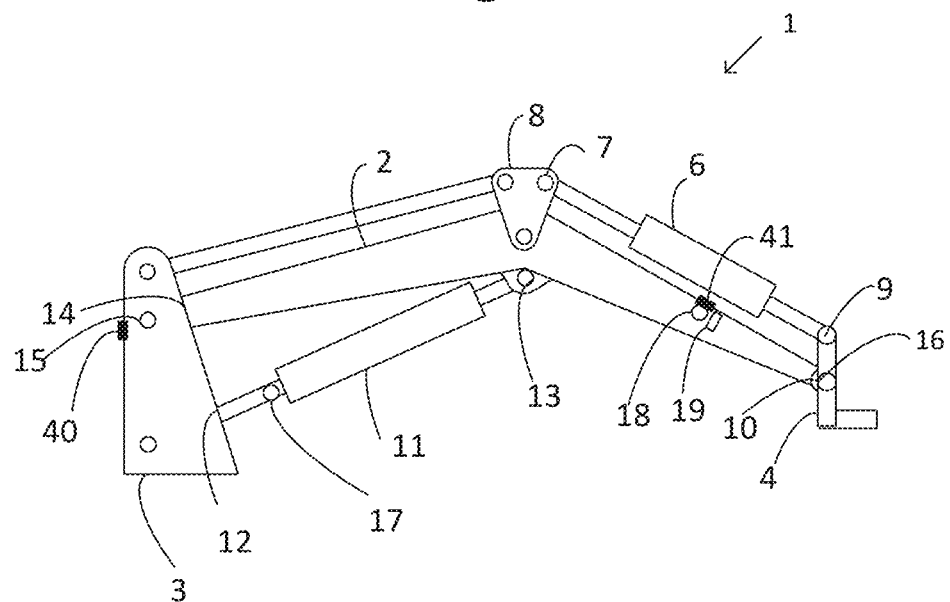
FIG. 1 illustrates an example of an implement attachable to a work vehicle.

Aspects of the present disclosure will be described more fully hereinafter with reference to the accompanying drawings. The apparatuses and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The present disclosure relates to an agriculture operation monitoring system. The agriculture operation monitoring system comprises at least one implement adapted to be connected to a work vehicle. The implement has one or a plurality of sensors arranged to obtain sensor signals related to at least one hydraulic function of the implement. The implement may further comprise a digital interface connectable to a work vehicle. The implement comprises further a local control element. The local control element is arranged to receive sensor signals obtained by the at least one sensor and to determine present settings indicative of an operational status of the implement based on the received sensor signals. The local control element is further arranged to form an output status message related to the present setting. The local control element may be connected to the digital interface.

The agriculture operation monitoring system comprises further a wireless communication element. The wireless element is arranged to receive the status message related to the operational status of the implement formed by the local control element. In one example, the wireless communication element is arranged at the implement.

In one example, the wireless communication element is arranged at the work vehicle. The wireless communication element may then be arranged to receive the status message related to the operational status of the implement via the digital interfaces of the implement and work vehicle.

In one example, the agriculture operation monitoring system comprises a wireless communication element both at the implement and the work vehicle.

The agriculture operation monitoring system comprises further a data storage and processing system. The wireless communication element may be arranged to feed the status message to the data storage and processing system or to at least one electronic user device. The at least one electronic user device may comprise an electronic user device installed in the work vehicle. The at least one electronic user device may comprise an electronic user device carried by a farmer at the agriculture field. The at least one electronic user device may comprise an electronic user device used by management staff for example at an office location. The at least one electronic user device may for example comprise a mobile application or a computer with network access suitable for an office.

In one example, the wireless communication element is in direct communication with the data storage and processing system. The data storage and processing system may in turn be arranged to communicate status and service information with at least one electronic user device.

In one example, the wireless communication element is instead or in addition to being in direct communication with the data storage and processing system, in direct communication with the at least one electronic user device. The electronic user device may then be arranged to communicate status and service information with the data storage and processing system.

Thus, either the electronic user device or the data storage and processing system is arranged to perform the monitoring and act thereon. However, it is preferred that when the agriculture operation monitoring system comprises an electronic user device, both the electronic user device and the data storage and processing system are updated. Thus, either the data storage and processing system updates the electronic user device or the electronic user device updates the data storage and processing system, or a combination thereof. The updating may be performed continuously or periodically, or whenever communication between the data storage and storage system and the electronic user device is available.

In FIG. 1 an implement 1 connectable to a work vehicle is illustrated. The implement is intended to form part of an agriculture operation monitoring system as disclosed herein. The implement forms in the illustrated example a front loader. The implement of the illustrated example forms an elongated working tool carrier.

In the illustrated example, the implement 1 comprises an arm 2. A fastening arrangement 3 is arranged at a first part of the arm. The fastening arrangement is connectable to the work vehicle. The fastening arrangement is in one example attached in relation to the arm 2 such that the arm can be moved in relation to the work vehicle. For example, the fastening arrangement 3 may be pivotally arranged in relation to the work vehicle. Thereby the arm can be made to make a pivoting movement in relation to the work vehicle around the pivot axis of the fastening arrangement.

The implement 1 further comprises an attaching arrangement 4 connected to a second part of the arm 2. The attaching arrangement 4 is attachable to a working tool 5. The attaching arrangement 4 is in one example attached in relation to the arm 2 such that the attachment arrangement possibly with the working tool can be moved in relation to the arm 2. For example, the attaching arrangement 4 may be pivotally arranged in relation to the arm. Thereby the attaching arrangement 4 can be made to make a tilting movement in relation to the arm.

In the illustrated example, the arm 2 is an elongated arm. The arm is in the illustrated example rigid. The arm is in one example straight. The arm has in one example an elbow. The arm may comprise a plurality of elongated supporting arms connected to each other by transverse supports.

In the illustrated example, the implement comprises a first hydraulic cylinder arrangement 6. The first hydraulic cylinder arrangement 6 is when actuated arranged to cause the implement to carry out at least one first function. In the example, the at least one first function comprises a control of the attachment arrangement, and consequently a working tool attached thereto, in relation to the arm 2. Thus, movement of the attaching arrangement, and the working tool, when attached, can be controlled by the first hydraulic cylinder arrangement 6. The attachment arrangement 4 and the working tool 5 can be controlled to perform a tilting movement. In the illustrated example, the first hydraulic cylinder arrangement 6 is at its first end 7 attached to the arm. The first hydraulic cylinder arrangement 6 is for example mounted to the arm 2 at the middle of the arm. The first hydraulic cylinder arrangement 6 is in the illustrated example at its first end 7 mounted at an elbow of the arm. In the illustrated example, the first hydraulic cylinder arrangement 6 is at its first end 7 mounted to a support 8 mounted at the arm. In one example, the first cylinder arrangement 6 comprises a pair of first hydraulic cylinders. In one example the first cylinder arrangement comprises one first hydraulic cylinder. When the arm comprises a plurality of elongated supporting arms connected to each other by transverse supports, one or a plurality of first cylinders can be mounted to each of the supporting arms.

Further, in the illustrated example, the first hydraulic cylinder arrangement 6 is at its second end 9 attached to the attaching arrangement 4 for attachment to the working tool 5. In one example, the first hydraulic cylinder arrangement 6 extends in parallel with the arm 2. Thus there is a radial distance between a point of (pivoting) attachment 10 of the attachment arrangement to the arm 2 and the point of attachment 9 of the first hydraulic cylinder arrangement 6 to the attachment arrangement 4. Thereby the attachment arrangement 4, and working tool 5 when attached, performs a pivoting movement in relation to the arm 2 as the piston(s) of the hydraulic cylinder arrangement 6 is extracted/retracted. In one example, the point of attachment of the second end 9 of the first hydraulic cylinder arrangement is straight above the point of attachment 10 of the attachment arrangement 4 at the arm 2. In one example, the attachment is such that the attachment arrangement 4 can perform a rotating movement in relation to the arm 2.

In the illustrated example, the implement 1 comprises further a second hydraulic cylinder arrangement 11. The second hydraulic cylinder arrangement 11 is when actuated arranged to cause the implement 1 to carry out a second function. In the illustrated example, the at least one second function comprises movement of the arm 2 in relation to the work vehicle, when the implement 1 is attached to the work vehicle. The arm 2 may be moved in a generally vertical direction in relation to the work vehicle. Movement of the arm 2 can be controlled by said second hydraulic cylinder arrangement 11. The arm 2 can be controlled to perform a pivoting movement. In the illustrated example, the second hydraulic cylinder arrangement 11 is at its first end 12 attached to the fastening arrangement 3. Further, in the illustrated example, the second hydraulic cylinder arrangement 11 is at its second end 13 attached to the arm 2. The first end 12 is attached to the fastening arrangement 3 at a radial distance from an attachment point 14 of the arm. Thereby, the arm 2 of the implement is caused to perform a movement upon action/retraction of the piston(s) in the second hydraulic cylinder arrangement 11. In one example, the first end 12 is attached to the fastening arrangement 3 vertically in relation to the attachment 14 of the arm to the fastening arrangement 3. In accordance with this example, the arm 2 of the implement 1 is caused to perform a lifting/lowering movement upon extraction/retraction of the positon(s) of the second hydraulic cylinder arrangement 11. In one example, the second cylinder arrangement 11 comprises a pair of second hydraulic cylinders. In one example the second cylinder arrangement comprises one second hydraulic cylinder. When the arm comprises a plurality of elongated supporting arms connected to each other by transverse supports, one or a plurality of second cylinders can be mounted to each of the supporting arms.

The first and/or second hydraulic cylinder arrangements 6, 11 are connected to a respective hydraulic circuit on the work vehicle, when the implement is attached to the work vehicle. The respective hydraulic circuit carries fluid to the corresponding at least one cylinder based on control from a hydraulic control valve at the work vehicle.

Different working tools 5 can be attached to the implement, such as a bucket, a bale handler etc.

An example of a working tool attachable to the implement is a standard bucket for transporting bulk material. The first cylinder arrangement 6 may be arranged to pivot the bucket. The second hydraulic cylinder arrangement 11 may be arranged to raise and lower the arm and consequently the bucket attached thereto.

Further, at least one sensor 15, 16, 17 is arranged at the implement. The at least one sensor may comprise at least one pressure sensor and/or at least one movement sensor.

In the illustrated example, one sensor 15 is arranged to obtain signals relating to the rotational position of the arm of the implement in relation to the work vehicle. In the illustrated example, one sensor 16 is arranged to obtain signals relating to the rotational position of the tool in relation to the implement. The sensors 16, 16 may be mounted at pivot points.

In one example, one or a plurality of sensors 17 is arranged to obtain signals related to a pressure in the second cylinder arrangement 11.

Further, the implement comprises a local control element 18. The local control element is in the illustrated mounted at the arm 2. However, it can be mounted anywhere at the implement 1.

The implement may further comprise at least one timer 19. The timer is arranged to communicate with the local control element. The timer 19 may be integrated within the local control element.

The at least one timer 19 may be arranged to determine a calendar time. The calendar time may represent a time since the implement was manufactured or last reset.

The at least one timer 19 may be arranged to determine a power time of the local control element. Thus, the timer then determines how long time the local control element has been powered-up. The power time may represent a time since the local control element was installed or last reset.

The at least one timer 19 may be arranged to perform a time in motion count. The time in motion count may measure the time the first or second hydraulic cylinder arrangement has been in motion. The time in motion count may represent a time since the implement was installed or last time reset. The at least one timer may be arranged to perform a time in motion count for the respective first and second hydraulic cylinder arrangement. The timer may be arranged to perform the time in motion count based on sensor signals. The timer may for example be arranged to perform the time in motion count based on sensor signals relating to the rotational position or movement of the arm of the implement in relation to the working tool. In the illustrated example, one sensor 16 is arranged to obtain sensor signals relating to the rotational position or movement of the tool in relation to the implement.

The local control element 18 is arranged to receive sensor signals obtained by the at least one sensor and to determine a present setting related to an operational status of the implement based on the received sensor signals. For example, the local control element may be arranged to determine the present setting based on a pressure cycle count. The local control element may be arranged to receive a time count from the at least one timer 19 and to determine the present setting related to an operational status of the implement also based on the received time count. The local control element may be arranged to provide at its output status message related to the present setting.

The local control element may be connected to a digital interface 40 to a work vehicle.

The local control element may be connected to a wireless communication element 41.

The local control element 18 is arranged to feed status message to the wireless communication element 41, if present, or to the digital interface 40 for further transmission to a wireless communication element arranged at the work vehicle.

The wireless communication element 41 is arranged to transmit the status message to a data storage and processing system or to at least one electronic user device.

Figure 2:
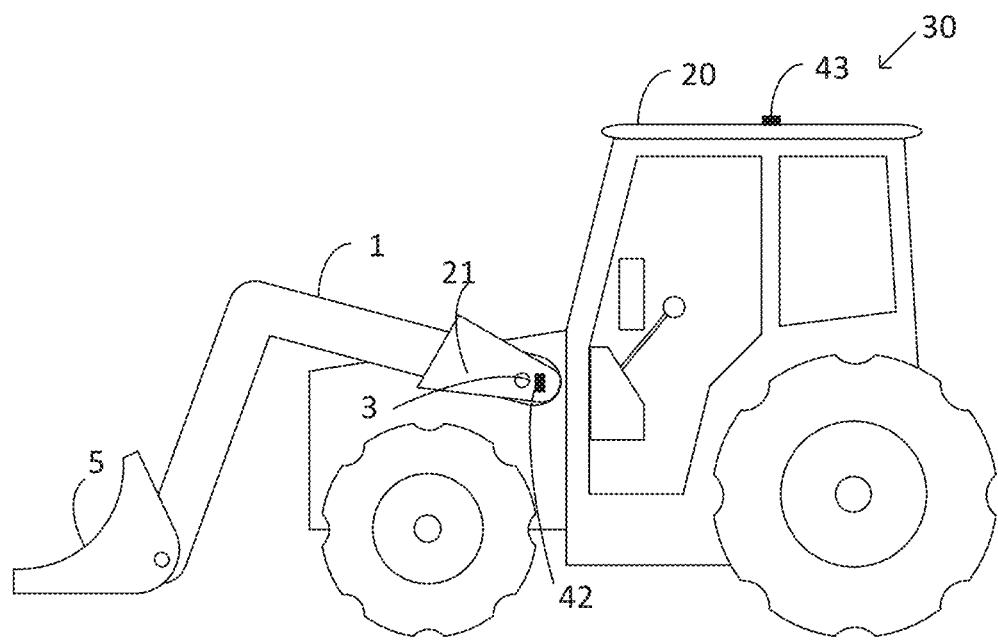
FIG. 2 illustrates an example of a work vehicle arrangement comprising a work vehicle and an implement attached thereto.

In FIG. 2, a work vehicle arrangement 30 is illustrated. The work vehicle arrangement 30 comprises a work vehicle 20 comprising a fastening arrangement 21 connectable to an implement 1, and said implement 1. The implement has a cooperating fastening arrangement 3 which fastens to the fastening arrangement 21 of the work vehicle. The implement 1 may be detachably fastened to the work vehicle. The implement may be fastened to the work vehicle such that the implement is rotatable around its points(s) of attachment in relation to the work vehicle in at least one direction.

The implement 1 may have the features as discussed in relation to FIG. 1.

The work vehicle 20 is arranged to support hydraulics to the function of the implement when said implement is connected to the work vehicle and the hydraulic system is pressurized.

As stated in relation to FIG. 1, the implement may be provided with a digital interface to the work vehicle. The work vehicle may be provided with a corresponding digital interface 42 to the implement. When the implement is connected to the work vehicle, digital communication between the work vehicle and the implement is obtained by means of the work vehicle and implement digital interfaces. Accordingly, when digital communication has been established between the implement and work vehicle, the status message may be communicated from the implement to the work vehicle 20.

The work vehicle 20 may be provided with a work vehicle wireless communication element 43. The work vehicle wireless communication element 43 is arranged to transmit to the status message to a data storage and processing system or to at least one electronic user device.

The work vehicle can be any type of work vehicle such an agricultural work vehicle such as a tractor.

In the illustrated example the work vehicle is a tractor. In the illustrated example the implement is a front loader.

The work vehicle further comprises a vehicle control element for control of vehicle functions. The vehicle control element is characteristically a distributed system of control nodes arranged to communicate with each other by means of a digital data bus. In one example, the vehicle control element is arranged to control supply of hydraulic fluid to hydraulic functions of the implement. In one example, the control of supply of hydraulic fluid to hydraulic functions of the implement is substantially performed by the local control element In FIGS. 3*a*-3*d* different setups for communication of a status message related to an operational status of an implement 1 are illustrated. The communications is performed over a communication network 90. The communication network may comprise a mobile [cellular] communication network and/or the Internet In FIGS. 3*a*-3*d* a work vehicle arrangement 30 is illustrated comprising a work vehicle 20 and an implement 1. This has been discussed in relation to FIGS. 1-2. The vehicle arrangement 30 comprises a wireless communication element 41, 43 is arranged to transmit the status message related to the operational status of the implement.

Figure 3A:
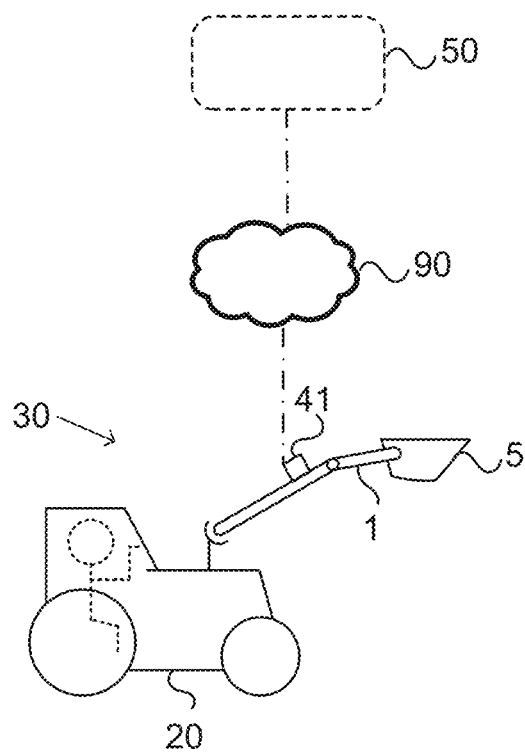
FIGS. 3a-3d illustrate examples of communication within an agriculture operation monitoring system.

In FIG. 3*a*, the wireless communication element 41 is arranged at the implement. The wireless communication element 41 is arranged to transmit status message related to the operational status of the implement to a data storage and processing system 50. Further, the data storage and processing system 50 may be arranged to transmit other data related to the operational status of the implement to the wireless communication element 41. The data may for example include threshold(s) and/or information related to last service event for use by the implement when determining a state parameter related to the operational status of the implement, service history etc.

The transmission is performed over the communication network 90.

Figure 3B:
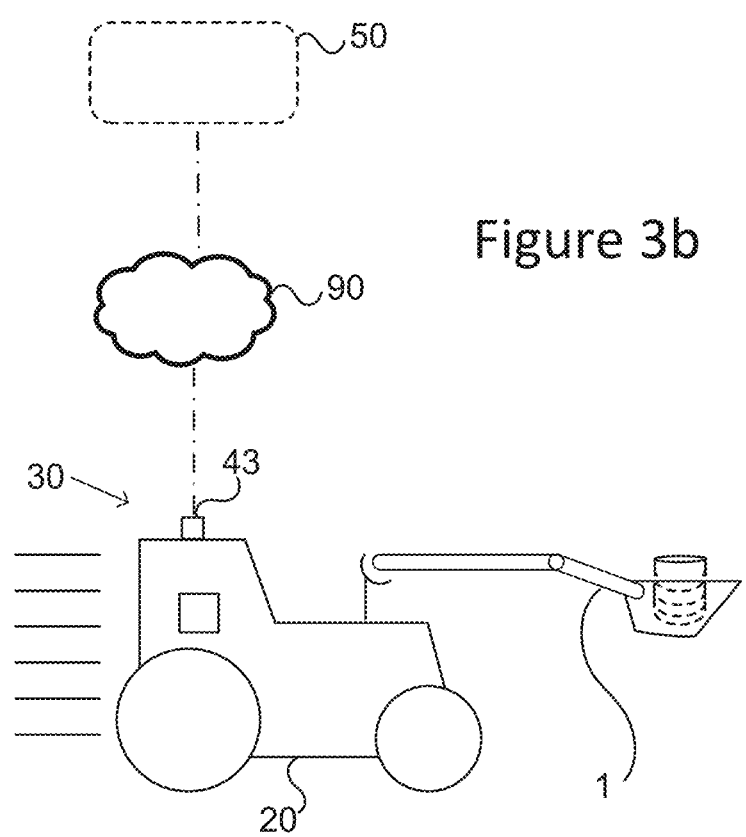

In FIG. 3*b*, the wireless communication element 43 is arranged at the work vehicle 20. The wireless communication element 43 is arranged to transmit the status message to the data storage and processing system 50. Further, the data storage and processing system 50 may be arranged to transmit other data related to the operational status of the implement to the work vehicle wireless communication element 43. The data may for example include threshold(s) and/or information related to last service event for use by the implement when determining a state parameter related to the operational status of the implement, service history etc.

The transmission is performed over the communication network 90.

Figure 3C:
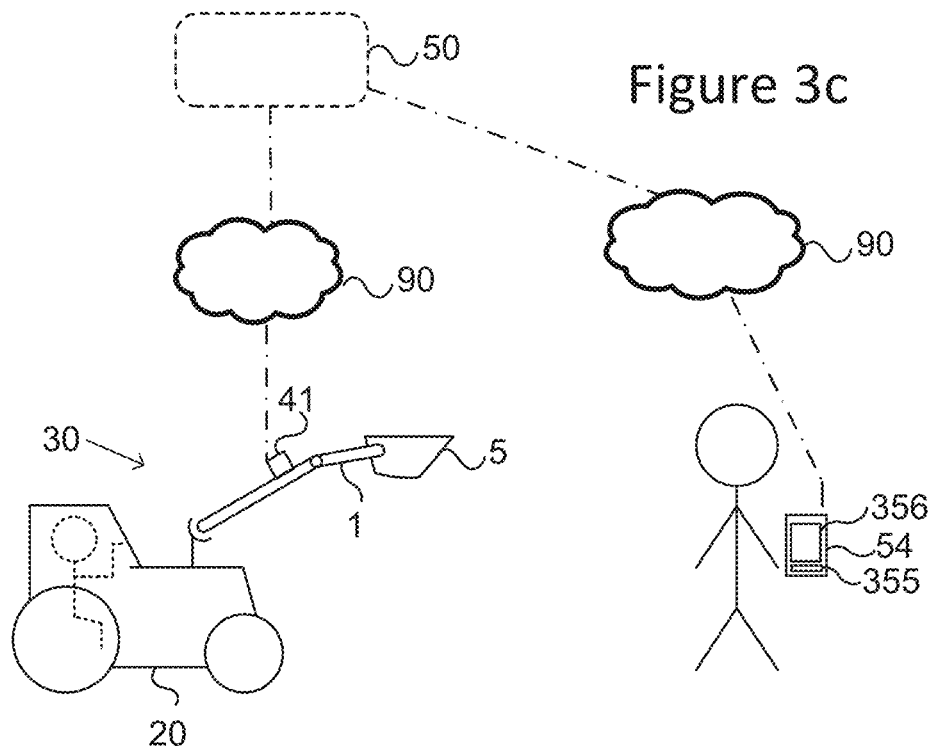

In FIG. 3*c*, the wireless communication element 41 is arranged at the implement. The wireless communication element 41 is arranged to transmit the status message to a data storage and processing system 50. As discussed above, the data storage and processing system 50 may be arranged to transmit other data related to the operational status of the implement to the wireless communication element 41.

The data may for example include threshold(s) and/or information related to last service event for use by the implement when determining a state parameter related to the operational status of the implement, service history etc.

The data storage and processing system 50 may also arranged to transmit data related to the operational status of the particular implement and possibly data related to other implements relevant for a particular user to an electronic user device 54.

The electronic user device 54 may comprise a display 356 arranged to present information related to the operational status of the particular implement and possibly other implements relevant for the particular user. The display may be a display with input means. The term "display with input means" is intended to include all both display with built-in input means and displays with input means connected thereto. Different examples of displays include displays with a touch screen or displays with or connected to a key board.

The electronic user device comprises an operator input element 355 such as a keyboard and/or a scroll wheel, etc. As is clear from the above, at least some of the functionality of the operator input element 355 may be integrated within the display 356.

Thus, the electronic user device 54 may be arranged to receive the status message.

The status message may comprise information, such as present settings or state parameters, for generating a status indicator. Alternatively, the status message comprises a status indicator. The status indicator forms an alert for performing service or maintenance or inspection. The alert may for example be associated to a calendar function of the electronic user device for planning a service/maintenance/inspection. The electronic user device may be configured to allow a user to send a confirmation message to the data storage and processing system once the service/maintenance/inspection has been executed in response to the alert. The data storage and processing system 50 may then be arranged to associate the service/maintenance/inspection confirmation to the corresponding status indicator in its memory. The confirmation message may further comprise a date for the service/maintenance/inspection. The date may be obtained from the calendar function of the electronic user device. The service/maintenance/inspection date may also be stored in the memory together with or as the service confirmation.

Figure 3D:
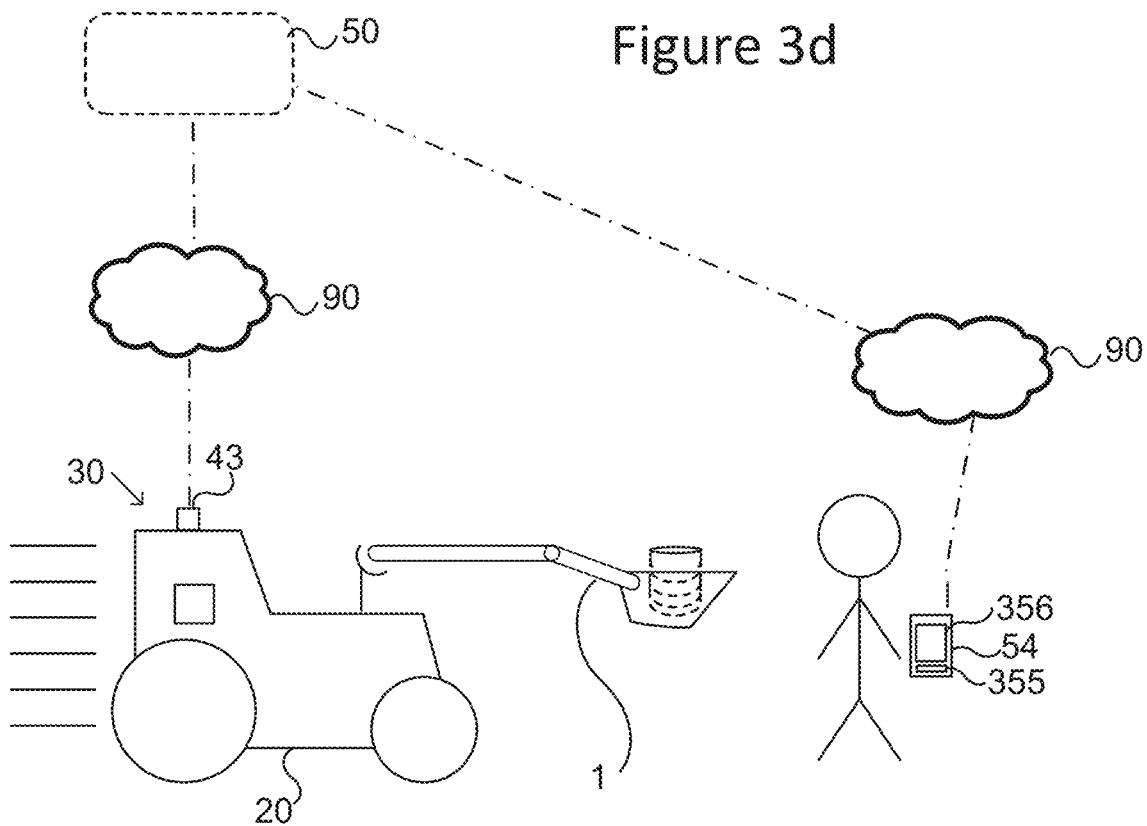

In FIG. 3*d*, the wireless communication element 43 is arranged at the work vehicle 20. The wireless communication element 43 is arranged to transmit a status message to the data storage and processing system 50. As discussed above, the data storage and processing system 50 may be arranged to transmit other data related to the operational status of the implement to the work vehicle wireless communication element 43.

The data may for example include threshold(s) and/or information related to last service event for use by the implement when determining a state parameter related to the operational status of the implement, service history etc.

The data storage and processing system 50 is also arranged to transmit data related to the operational status of the particular implement and possibly data related to other implements relevant for a particular user to an electronic user device 54 in analogy with the description in relation to FIG. 3*c*.

In FIGS. 4a-4d further illustrate different setups for communication of a status message related to an operational status of an implement 1 are illustrated. The communications is performed over a communication network 90, 90'. The communication network 90, 90 may comprise a mobile [cellular] communication network and/or the Internet and/or short range communication such as Bluetooth and/or Wi-Fi and/or radio.

In FIGS. 4a-4d a work vehicle arrangement 30 is illustrated comprising a work vehicle 20 and an implement 1. This has been discussed in relation to FIGS. 1-2. The vehicle arrangement 30 comprises a wireless communication element 41, 43 is arranged to transmit status messages related to the operational status of the implement. The status message may be determined as disclosed in relation to FIG. 1.

Figure 4A:
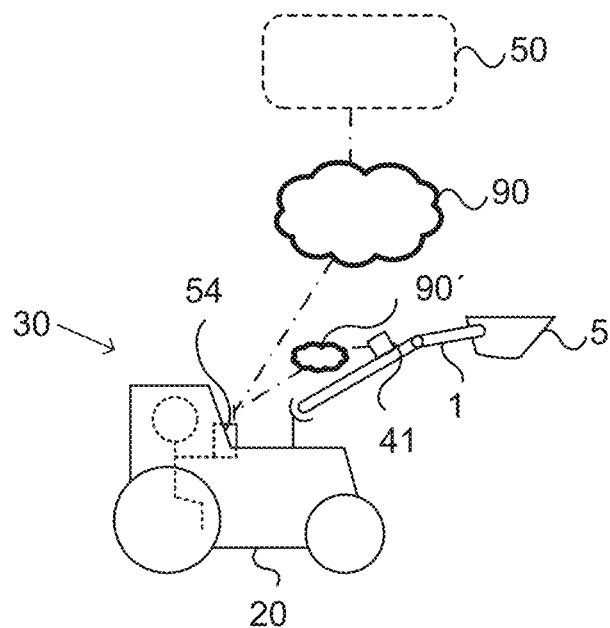
FIGS. 4a-4d illustrate further examples of communication within an agriculture operation monitoring system.

In FIG. 4a, the wireless communication element 41 is arranged at the implement. The wireless communication element 41 is arranged to transmit status messages to at least one electronic user device 54. The electronic user device 54 may have the features as discussed in relation to FIGS. 3c and 3d.

In the illustrated example, the electronic user device 54 is placed in the work vehicle 20. For example, the work vehicle may comprise a mount for detachable mounting of the electronic user device 54 in the work vehicle. In accordance with this example, the wireless communication element 41 may arranged for short range communication, such as Bluetooth and/or Wi-Fi and/or radio. The wireless communication element 41 may for example comprise a short range communication element such as a Bluetooth chip.

The electronic user device 54 may be arranged at another location than within the work vehicle. For example, the electronic user device may be carried by a user. Alternatively, the electronic user device is intended for an office location and comprises for example a stationary computer or a laptop.

The electronic user device 54 is arranged to communicate with a data storage and processing system 50. The electronic user device may be arranged to transmit the status message received from the wireless communication element 41 to the data storage and processing system.

Further, the data storage and processing system 50 may be arranged to transmit data related to the operational status of the implement to the electronic user device 54. Some of the transmitted data may be intended for a local control element of the implement. In accordance therewith, the electronic user device 54 may be arranged to transmit that data to the wireless communication element 41 for further transmission to the local control element of the implement 1. The data transmitted from the data storage and processing system 50 may for example include threshold(s) and information related to time of last service event(s) for use by the implement when determined the stated parameter related to the operational status of the implement. The data transmitted may also include service history etc. for use by the electronic user device 54 and/or the local control element of the implement 1.

The transmissions are performed over the communication network 90, 90'. Reference sign 90' refers to a short range network part for communication between the wireless communication element 41 and the electronic user device 54. However, this is only an example, communication between the wireless communication element 41 and the electronic user device 54 can be of any type.

Figure 4B:
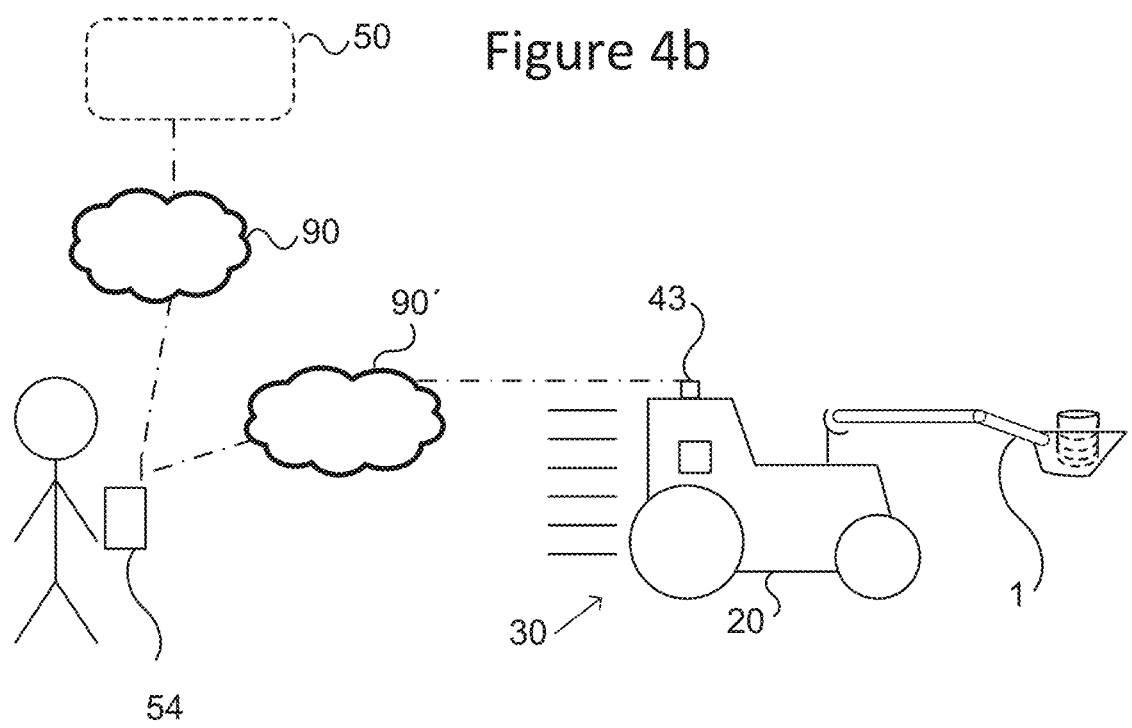

In FIG. 4b, the wireless communication element 43 is arranged at the work vehicle 20. The wireless communication element 43 is arranged to status messages related to the operational status of the implement to at least one electronic user device 54. The electronic user device 54 may have the features as discussed in relation to FIGS. 3c and 3d.

In the illustrated example, the electronic user device 54 is carried by a user. However, this is only an example. The electronic user device may for example be placed in the work vehicle 20. For example, the work vehicle may comprise a mount for detachable mounting of the electronic user device 54 in the work vehicle. The electronic user device may comprise a stationary computer or a laptop.

Reference sign 90' refers to a short range network part for communication between the wireless communication element 43 and the electronic user device 54. Thus, the wireless communication element 43 may arranged for short range communication, such as Bluetooth and/or Wi-Fi and/or radio. The wireless communication element 43 may for example comprise a short range communication element such as a Bluetooth chip. However, this is only an example, communication between the wireless communication element 43 and the electronic user device 54 can be of any type.

As was discussed in relation to FIG. 4a, the electronic user device 54 is arranged to communicate with a data storage and processing system 50 over the communication network 90. The electronic user device 54 may be arranged to transmit status messages received from the wireless communication element 43 to the data storage and processing system 50.

Further, as was discussed in relation to FIG. 4a, the data storage and processing system 50 is arranged to transmit data related to the operational status of the implement to the electronic user device 54. Some of the transmitted data may be intended for a local control element of the implement. In accordance therewith, the electronic user device 54 may be arranged to transmit that data to the wireless communication element 43 for further transmission to the local control element of the implement 1. The data transmitted from the data storage and processing system 50 may for example include threshold(s) and/or information related to last service event(s) for use by the implement when determining the present settings related to the operational status of the implement. The data transmitted may also include service history etc. for use by the electronic user device 54 and/or the local control element of the implement 1.

Figure 4C:
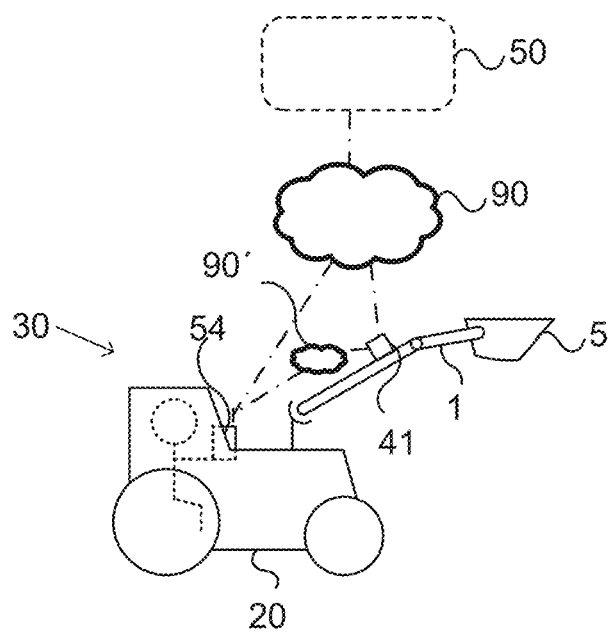

In FIG. 4c, the wireless communication element 41 is arranged at the implement 1. The wireless communication element 41 is arranged to communicate both with a data storage and processing system 50 and an electronic user device 54. Further, the electronic user device 54 is arranged to communicate with the data storage and processing system 50.

The wireless communication element 41 is arranged to transmit the status messages related to the operational status of the implement to either the data storage and processing system 50 or the electronic user device 54, or both. Further, the data storage and processing system 50 may be arranged to transmit data related to the operational status of the implement to the electronic user device 54 or to the wireless communication element 41, or both. The data may for example include threshold(s) and or information related to last service event(s) for use by the implement when determining the present settings related to the operational status of the implement, service history etc. The data may comprise other data related to the operational status of the particular implement and possibly data related to other implements relevant for a particular user to an electronic user device 54.

In accordance with this communication set-up, the electronic user device 54 and the data storage and processing system 50 may be arranged to receive the status messages. The status messages may comprise information, such as present settings or state parameters, for generating a status indicator. Alternatively, the status message comprises a status indicator. The status indicator forms an alert for performing service or maintenance or inspection. In one example, the electronic user device 54 receives the status message from the wireless communication device 41, possibly processes the information in the status message and updates the data storage and processing system 50, when appropriate. In one example, the data storage and processing system 50 receives the status message from the wireless communication device 41, possibly processes the information therein, and updates the electronic user device 54, when appropriate. In one example, both the electronic user device 54 and the data storage and processing system receives the status message directly from the wireless communication device 41.

The status indicator, as discussed above, may form an alert for performing service or maintenance or inspection. The alert may for example be associated to a calendar function of the electronic user device for planning a service/maintenance/inspection. The electronic user device may be configured to allow a user to send a confirmation message to the data storage and processing system once the service/maintenance/inspection has been executed in response to the alert. The data storage and processing system 50 may then be arranged to associate the service/maintenance/inspection confirmation to the corresponding status indicator in its memory. The confirmation message may further comprise a date for the service/maintenance/inspection. The date may be obtained from the calendar function of the electronic user device. The service/maintenance/inspection date may also be stored in the memory together with or as the service confirmation.

Further, the data storage and processing system 50 is arranged to transmit data related to the operational status of the implement to the electronic user device 54 and/or to the wireless communication element 41. Some of the transmitted data may be intended for a local control element of the implement. In accordance therewith, when the electronic user device 54 receives such data, the electronic user device is arranged to transmit that data to the wireless communication element 41 for further transmission to the local control element of the implement 1. The data transmitted from the data storage and processing system 50 may for example include threshold(s) and/or information related to last service event(s) for use by the implement when determined the stated parameter related to the operational status of the implement. The data transmitted may also include service history etc. for use by the electronic user device 54 and/or the local control element of the implement 1.

Figure 4D:
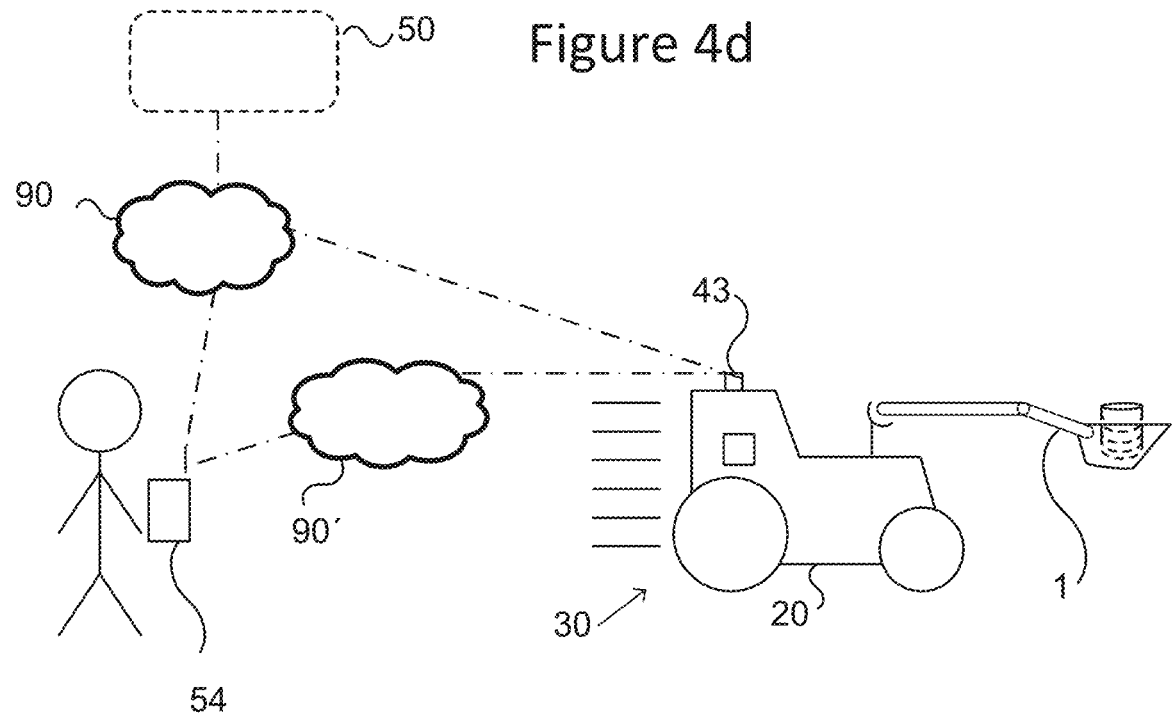

In FIG. 4d, the wireless communication element 43 is arranged at the work vehicle 20. The wireless communication element 43 is arranged to communicate both with a data storage and processing system 50 and an electronic user device 54. The example of FIG. 4d corresponds otherwise to the example discussed in relation to FIG. 4c.

FIG. 5 illustrates an example of a part of contents of a storage 57 for storing information related to which operational status types of a particular implement are monitored. This storage may be present in a storage and processing system and/or at least one electronic user device and/or in a local control element. Parts of the contents of the storage 57 may be present in some or all of the storage and processing system and/or at least one electronic user device and/or in a local control element. Other parts of the storage may only be present in one of the storage and processing system, at least one electronic user device and/or local control element.

In the illustrated example, the implement is identified by an implement ID 56. The implement ID 56 is characteristically unique for that particular implement. The implement ID is stored in the storage 57. The implement ID may be present on a tag mounted on the particular implement.

The storage 57 comprises further information related to a set of service event types 58. In the illustrated example the different service event types 58 are selected for monitoring. The different service event types may for example be user selected. In the illustrated example, monitoring selection information 59 is associated to each for each event type 58 in the storage. Thus, a yes or no is associated to each service event type, where the yes or no indicates whether the service event type is monitored or not. In the illustrated example, monitoring is performed for the following service event types: hydraulic accumulator maintenance, hydraulic accumulator replacement, replacement/maintenance/inspection of arm, replacement/maintenance/inspection of fastening arrangements and replacement/maintenance of bearings. Further, in the illustrated example, the following service event types are not monitored: hose replacement/maintenance/inspection, and replacement/maintenance/inspection bearing box.

The storage 57 comprises further one or a plurality of threshold types 61 associated to each service event type 58. For example, in the illustrated example, calendar time determines when it is time for hydraulic accumulator replacement. Further, a threshold type denoted pressure cycle count 1 determines when it is time for hydraulic accumulator replacement. The digit "1" may indicate which cylinder is monitored, for example if is a cylinder used for movement of the implement arm or a cylinder for movement of a tool attached to the implement. In the same manner, one or a plurality of threshold types 61 are associated to each service event type 58 in the storage.

The storage and processing system and/or the electronic user device is further in accordance with this example arranged to store a threshold setting 62 for use by the local control element in determining a state parameter related to the operational status of the implement.

Thus, the storage and processing system is capable of handling implements each identified by their unique identity. Each implement may be associated to thresholds which are relevant for that particular implement and for the service event types monitored. The threshold may be tailored for the components used in that particular implement. The threshold may be set at the manufacturer or service or garage site.

The storage and processing system and/or the electronic user device may be arranged to transmit the threshold to the implement having the associated identity.

Thus, in accordance therewith, the threshold setting(s) is/are communicated to the local control element of the implement having the particular identity. Whenever the threshold is updated, the storage and processing system may be arranged to communicate the updated threshold to the local control element of the implement having that particular identity.

FIG. 6 illustrates examples of a part of contents of a storage 57 for storing information related to operational values 64 of the implement. This storage part may be present in a storage and processing system and/or at least one electronic user device and/or in a local control element.

In the illustrated examples, the implement is identified by an implement ID 56. This was also discussed in relation to FIG. 5.

In the illustrated examples, the different types of operations 63 which are monitored in the implement are stated. In the illustrated example a pressure count is monitored. As was also discussed in relation to FIG. 5, the digits "1" and "2" may indicate which cylinder is monitored, for example digit "2" may indicate a cylinder used for movement of the implement arm and digit "1" may indicate a cylinder for movement of a tool attached to the implement. Different examples of performing pressure cycle count will be presented later in this disclosure.

Further, in the illustrated examples a time in motion count is monitored. The digits "1" and "2" may indicate which motion is monitored, for example digit "2" may indicate a movement of the implement arm and digit "1" may indicate a movement of a tool attached to the implement.

Further, in the illustrated examples, a power time is monitored. The power time relates to the time the local control element is powered up.

Further, in the illustrated example, a calendar time is monitored.

The storage 57 comprises further an operational value 64 associated to each operation 63. The operational values 64 may be vales relating to a timing of manufacture/first installation or a timing of a last reset.

FIG. 7a illustrates an example of a part of contents of a storage 57 for storing information related to monitoring of operational status for performing service events for a plurality of operational status types of a particular implement. This storage part may be present in a storage and processing system and/or at least one electronic user device and/or in a local control element.

In the illustrated examples, the implement is identified by an implement ID 56. This was also discussed in relation to FIGS. 5 and 6.

In the illustrated examples, the different types of operations 63 which are monitored in the implement are stated. The storage 57 comprises further an operational value 64 associated to each operation 63. The operational values 64 may be vales relating to a timing of manufacture/first installation or a timing of a last reset. This was described more in detail in relation to FIG. 6.

As was further discussed in relation to FIG. 5, the service event types 58 monitored are each associated to at least one threshold type. For each service event type 58 each threshold type 61 is associated to a threshold setting 62, as was also described in FIG. 5. The threshold setting is denoted WT.

Further, for each service event type 58, an operational value 65 for each monitored operation when service of each individual service event type was last made is further associated to the service event type. This is herein referred to last service and denoted WLS.

A different between a present setting 66 of the operational values as fetched from the monitoring of the implement (reference 64) and the setting WLS at last service 65 is compared to the threshold setting WT 62. A state parameter, SP, for example defined as a percentage 67 may then be determined for each monitored threshold type for each monitored service event type. The present setting is herein denoted WPS.

The storage 57 further comprises status indicators 68 related to service events where a status indicator related to the operational status of the implement has been obtained. The status indicator may be obtained when the state parameter SP or percentage for a particular event type has reached a predetermined percentage such as 100%. In a more refined example, which is illustrated in FIG. 7a, the status indicator 68 is associated to an attribute 69. The attribute may indicate an alert level. In the illustrated example, an alert status indicator is obtained when the state parameter, SP, 67 for a particular event type has reached a first predetermined percentage. The first predetermined percentage is for example 85%. Further, a service due indicator is obtained when the status indicator, SP, for a particular event type has reached a second, higher, predetermined percentage. The second predetermined state percentage may for example be 100%

For service event types where a plurality of operations are monitored, that state parameter, SP, which first reaches the predetermined percentage may trigger the obtaining of a status indicator. Alternatively, some average value or another rule for triggering the obtaining of the status indicator may apply.

FIG. 7b illustrates an example of a part of contents of a storage 57 for storing historical information related to performed service events, i.e. for storing a service history 73. This storage part may be present in a storage and processing system and/or at least one electronic user device and/or in a local control element.

In the illustrated examples, the implement is identified by an implement ID 56. This was also discussed in relation to FIGS. 5, 6 and 7a.

The storage of performed service event allows for following up on the status of a particular implement or a group of implements. The historical information related to service events may be used for presenting when the latest service event took place. It may also be presented to which service type the latest service event belongs. The service history may be presented along with the status indicators as described in relation to FIG. 7a.

The storage and processing system and/or at least one electronic user device may be arranged to provide a status report related to a predefined implement or group of implements, wherein the status report may include current status indicators and/or service history.

The entire service history for the specific implement or group of implements may also be presented. Such a service summary may for example be used for decision support related to an amount of time and/or costs are to be spent within a certain time period related to maintenance service. The service summary may also give at hand it may be advisable to completely remove some implement from use. Accordingly, an entire float of implements may be monitored.

The storage and processing system and/or the at least one electronic user device may be arranged to provide a status report related to a predefined type of service event.

Figure 8:
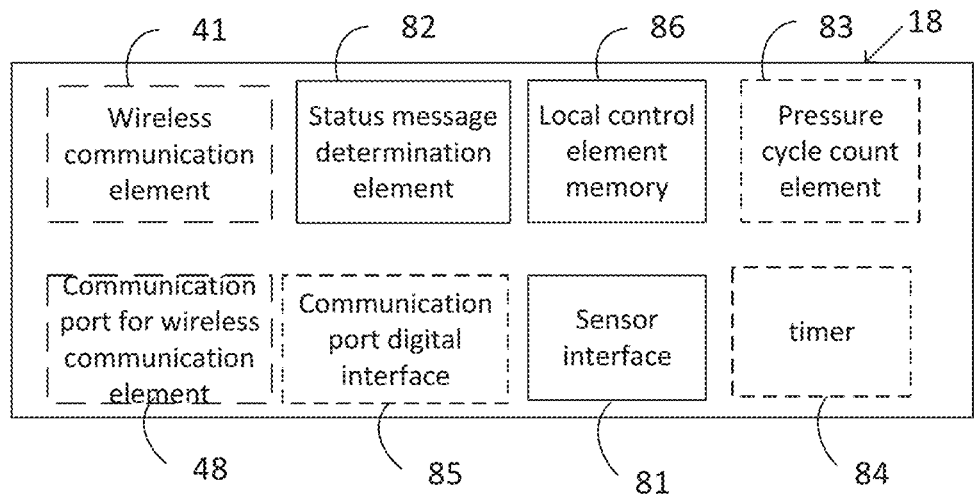
FIG. 8 is a schematic illustration of an example of a local control element.

In the illustrated example the service history 73 may for each service event type 58 comprise at least some of the following: threshold type 61, date(s) of service(s) 71 and settings of the operational values at the respective service, WLS FIG. 8 illustrates an example of a local control element 18 intended to be mounted on an implement such as a front loader of a work vehicle. The local control element 18 is arranged to determine at least one present setting WPS related to an operational status of the implement and to output the status massage related to the present setting.

The local control element 18 comprises a sensor interface 81 arranged to receive sensor signals related to at least one hydraulic function of the implement. The sensor signals may comprise position and/or angular position and/or movement and/or angular movement and/or pressure signals related to different hydraulic functions of the implement. The angular position/movement sensors may be arranged in pivot points of the implement.

The local control element 18 further comprises a status message determination element 82. The status message determination element is arranged to determine at least one present setting WPS at least in part based on the sensor signals received over the sensor interface 81.

The present setting related to the operational status of the implement forms a service indicator related to service operations available at the data storage and processing system. The local control element can locally continuously determine the present setting. The status message related to the present setting is fed to the data storage and processing system or electronic user device.

In one option, the status message comprises the determined present setting WPS and the implement ID.

In one option, the status message determination element 82 is arranged to determine a state parameter, SP, indicative of the status in relation to when service/maintenance/inspection is due. The state parameter is determined based on the present setting WPS and a threshold setting WT and possibly a setting at last service WLS. The status message may then include the determined state parameter, SP.

In one option, the status message determination element 82 is arranged to generate a status indicator indicative of that it is time for maintenance/service/inspection. In accordance therewith, the status message determining element 82 determines when the state parameter reaches a predetermined level, and generate a status indicator indicative of that it is time for maintenance/service inspection. A status message is then generated upon generation of a status indicator.

Thus, the present setting is characteristically determined locally at each implement and the determined present settings or information originating therefrom may then be made available via the storage and processing system and/or the electronic user device.

This means that all data related to the operational status of one implement is always handled locally by that implement. Thereby it is secured that the data used for the present settings and consequently service indicators is related to that implement. Further, it is secured that the determination is made correctly as the implement characteristically knows its own characteristics.

In operation, the status indicator determination element continuously monitors at least one state parameter W describing a relation between states of the implement in relation to a threshold setting. When the state parameter exceeds a predetermined value, a status indicator is generated. The status indicator may for example be generated when the threshold has been reached or a predetermined percentage of the threshold has been reached.

The local control element 18 may comprise a pressure cycle count element 83 arranged to perform the pressure cycle count based on pressure signals received via the sensor interface 81. Examples of procedures for performing pressure cycle count are discussed in the application examples disclosed later herein. The status message determination element 83 is then arranged to determine the present setting, possibly the state parameter and/or the status indicator and to generate the status message based on the pressure cycle count.

The local control element 18 may further comprise or is connected to at least one timer 84. The status message determination element 83 is then arranged to determine the present setting, possibly the state parameter and/or the status indicator and to generate the status message r based on a time count made by the timer. The timer may be arranged to perform a time in motion count based on position and/or angular position and/or movement and/or angular movement signals received via the sensor interface. The timer 84 may instead or in addition thereto be arranged to determine a calendar time. The timer 84 may instead or in addition thereto be arranged to determine a power time of the local control element.

The local control element 18 may further comprise a wireless communication element 41. The wireless communication element is arranged to transmit the status message to a data storage and processing system and/or to at least one electronic user device.

The local control element 18 may instead comprise a communication port 48 for connection to a wireless communication element arranged elsewhere on the implement.

The local control element 18 may further or instead comprise a communication port 85 for connection to a digital interface of the implement. The digital interface of the implement is then connectable to a corresponding digital interface of a work vehicle. The status message may then be communicated via the digital interfaces to a wireless communication element present at the work vehicle.

The local control element 18 comprises further or is connected to a local control element memory 86. The local control element memory is characteristically arranged to store all data related to the operational status of the implement. Thereby, all data related to the implement, including its operational history, may be present at the implement. The data can then be inspected at any time. Another advantage is that as the data is stored at the implement and the entire operational history is available at the implement the data is not disrupted by for example sale of the implement. Instead, the data forms an integrated part of the implement.

In detail, the local control element memory 86 may be arranged to store at least some of the following data
  Implement ID
  Available and/or monitored service event types for the particular implement
  Threshold types and threshold settings $W_T$ for the available and/or monitored service event types
  Present operational values all for monitored operations (e.g. pressure cycle counts, time in motion counts, power time, calendar time),
  Present settings $W_{PS}$ of the monitored operations for each service event type,
  Settings at last service $W_{LS}$ of the monitored operations for each service event type,
  Present state parameter value(s) SP, i.e. a relation between present settings and threshold settings, such as $$SP = \frac{\text{present setting } WPS - \text{last service } WLS}{\text{threshold setting } WT}$$

Issued Status indicators, issued when the state parameters SP exceed a predetermined value such as 1 or 0.85.
  Service history for example for each service event type.

Figure 9:
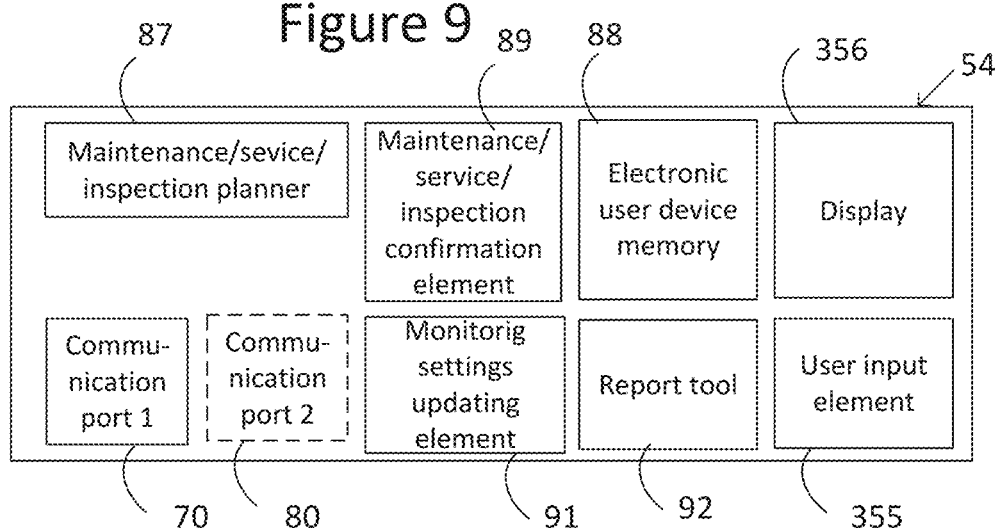
FIG. 9 is a schematic illustration of an example of an electronic user device.

FIG. 9 illustrates an electronic user device 54. The electronic user device 54 may be an electronic user device installed in a work vehicle. The at least one electronic user device may be carried by a farmer at the agriculture field. The at least one electronic user device may be used by management staff for example at an office location. In accordance with this example, the electronic user device may comprise a stationary computer or a lap top. The electronic user device comprises a display 356 and a user input element 355.

The electronic user device may comprise a first communication port 70 adapted for bidirectional digital communication with a digital port of the implement. This communication port may be adapted for short range communication such as Wi-Fi, Bluetooth and/or radio communication. Instead or additionally, the electronic user device may comprise a second communication port 80 which is connectable to a communications network.

The electronic user device 54 may be arranged to receive status messages related to an operational status of the implement, as determined by the local control element via the first communication port 70 and/or second communication port 80.

The received status messages may be sent to a maintenance/service/inspection planner 87.

In one option, the status message comprises the determined present setting WPS and the implement ID. The planner 87 is then arranged to determine a state parameter, SP, indicative of the status in relation to when service/maintenance/inspection is due. The state parameter is determined based on the present setting WPS and a threshold setting WT and possibly a setting at last service WLS. The planner 87 is further arranged to determine when the state parameter reaches a predetermined level, and generate a status indicator indicative of that it is time for maintenance/service inspection.

In one option, the status message comprises the state parameter, SP. The planner 87 is further arranged to monitor further status messages and to based thereon determine when the state parameter reaches a predetermined level, and generate a status indicator indicative of that it is time for maintenance/service inspection.

In one option, the status message comprises the status indicator.

The maintenance/service/inspection planner 87 may be arranged to generate an alert upon reception or generation of the status indicator. The alert may indicate that maintenance/service/inspection is due. The maintenance/service/inspection planner may be associated to a calendar function of the electronic user device 54 for planning a service/maintenance/inspection. The maintenance/service/inspection planner 87 may be arranged to generate service message to a maintenance location and/or a data storage and processing system upon user request. The service message is then transmitted to the maintenance location and/or data storage and processing system for example via the second communication port 80.

The received status messages and/or determined state parameters and/or determined status indicators may further be stored in a memory 88 along with associated implement ID.

The electronic user device 54 may further comprise a confirmation element 89 configured to allow a user to generate a confirmation once maintenance/service/inspection has been performed. The confirmation element may be arranged to either automatically or upon user request transmit a confirmation message to a data storage and processing system once the service/maintenance/inspection has been executed in response to the alert. The confirmation message may comprise the settings of relevant operational values at the service, if available to the electronic user device.

The electronic user device 54 may further comprise a monitoring setting updating element 91. The monitoring setting updating element 91 may in response to user input via the user input element be arranged to select service event types monitored. The monitoring setting updating element may be arranged to update the memory with updated information received from a data storage and processing system and/or local control element. For example, the monitoring setting updating element may be arranged to update the electronic user device memory with amended threshold settings WT and current operational values.

Further, the electronic user device may comprise a report tool 92. The report tool may be arranged to generate, upon user request, a status report related to a predefined implement or group of implements. This status report may comprise currently active status indicators.

The report tool may instead or in addition thereto be arranged to generate a status report related to the entire service history for the specific implement or group of implements. Such a service summary may for example be used for decision support related to an amount of time and/or costs are to be spent within a certain time period related to maintenance service. The service summary may also give at hand it may be advisable to completely remove some implement from use. Accordingly, an entire float of implements may be monitored.

The report tool may further be arranged to provide a status report related to a predefined type of service event.

In detail, the memory 88 of the electronic user device 54 may be arranged to store at least some of the following data
Implement IDs
Available and/or monitored service event types for the implement IDs associated to the user of the electronic user device
Threshold types and threshold settings $W_T$ for the available and/or monitored service event types
Present operational values all for monitored operations (e.g. pressure cycle counts, time in motion counts, power time, calendar time)
Present settings $W_{PS}$ of the monitored operations for each service event type,
Settings at last service $W_{LS}$ of the monitored operations for each service event type,
Present state parameter value(s) SP, i.e. a relation between present settings and threshold settings, such as $$SP = \frac{\text{present setting } WPS - \text{last service } WLS}{\text{threshold setting } WT}$$

Figure 10:
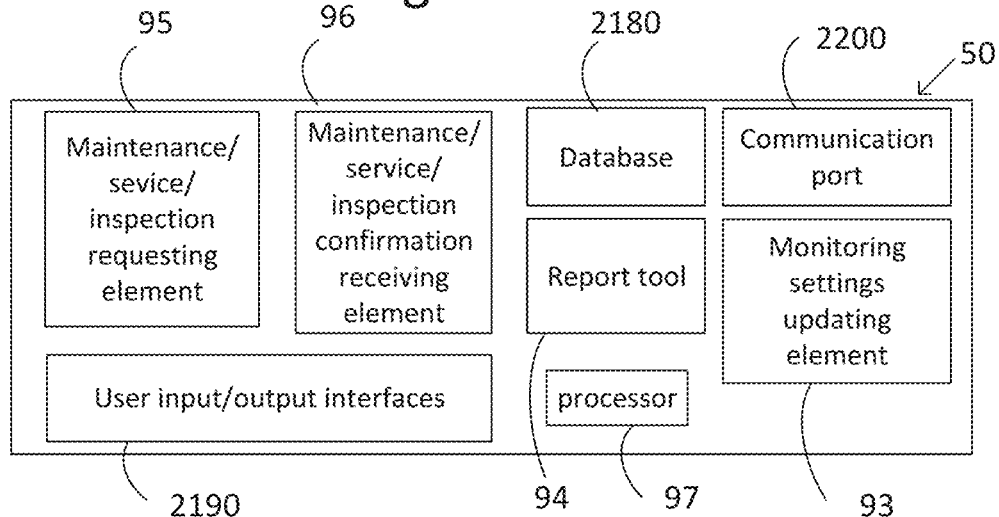
FIG. 10 is a schematic illustration of an example of a data storage and processing system.

Issued Status indicators, issued when the state parameters SP exceed a predetermined value such as 1 or 0.85.
Service history for example for each service event type.
FIG. 10 discloses a data storage and processing system 50. The data storage and processing system may be formed as a main server computer. The main server computer may comprise a main database 2180. The main server computer may further comprise a main server computer user input/output interfaces 2190. The main server computer comprises further a communications port 2200 connectable to the communications network/Internet 90.

The main database 2180 is arranged to store at least some of the following information:
Implement IDs
Available and/or monitored service event types for the implement IDs associated to the user of the electronic user device
Threshold types and threshold settings $W_T$ for the available and/or monitored service event types Present operational values all for monitored operations (e.g. pressure cycle counts, time in motion counts, power time, calendar time)

Present settings $W_{PS}$ of the monitored operations for each service event type, Settings at last service $W_{LS}$ of the monitored operations for each service event type, Present state parameter value(s) SP, i.e. a relation between present settings and threshold settings, such as $$SP = \frac{\text{present setting } WPS - \text{last service } WLS}{\text{threshold setting } WT}$$

Issued Status indicators, issued when the state parameters SP exceed a predetermined value such as 1 or 0.85.

Service history for example for each service event type.

The data storage and processing system 50 may comprise a threshold settings updating element 93. The threshold settings updating element 93 may be arranged to perform statistical analysis on data in the database so as to update thresholds. Alternatively thresholds are formed by experimentation.

The data storage and processing system may comprise a report tool 94. The report tool 94 may be arranged to generate, upon user request, a status report related to a predefined implement or group of implements. The entire service history for the specific implement or group of implements may also be presented. The storage and processing system may further be arranged to provide a status report related to a predefined type of service event.

The data storage and processing system 50 may further comprise a maintenance/service/inspection requesting element 95. The maintenance/service/inspection requesting element may for example be arranged to request maintenance for example at a garage. This request may comprise relevant information such as service event type. This request may be followed by a reply from the garage with available time slots for maintenance/service/inspection. The maintenance/service/inspection requesting element may further be arranged to transmit the received time slots to a maintenance/service/inspection planner of an electronic user device.

The data storage and processing system may further comprise a maintenance/service/inspection confirmation receiving element 96 arranged to receiver over the communication port 2200 a confirmation. The confirmation may comprise implement ID, service event type and settings of relevant operational parameters at maintenance/service/inspection. The information in the confirmation message is stored in the database 2180.

In addition thereto, the data storage and processing element may be arranged to performed operations as discussed in relation to the electronic user device. Accordingly, the data storage and processing element may comprise a processor 97 arranged to receive status messages related to an operational status of the implement, as determined by the local control element via the communication port 2200.

In one option, the status message comprises the determined present setting WPS and the implement ID. The processor 97 is then arranged to determine a state parameter, SP, indicative of the status in relation to when service/maintenance/inspection is due. The state parameter is determined based on the present setting WPS and a threshold setting WT and possibly a setting at last service WLS. The processor 97 is further arranged to determine when the state parameter reaches a predetermined level, and generate a status indicator indicative of that it is time for maintenance/service inspection.

In one option, the status message comprises the state parameter, SP. The processor 97 is further arranged to monitor further status messages and to based thereon determine when the state parameter reaches a predetermined level, and generate a status indicator indicative of that it is time for maintenance/service inspection.

In one option, the status message comprises the status indicator.

Figure 11:
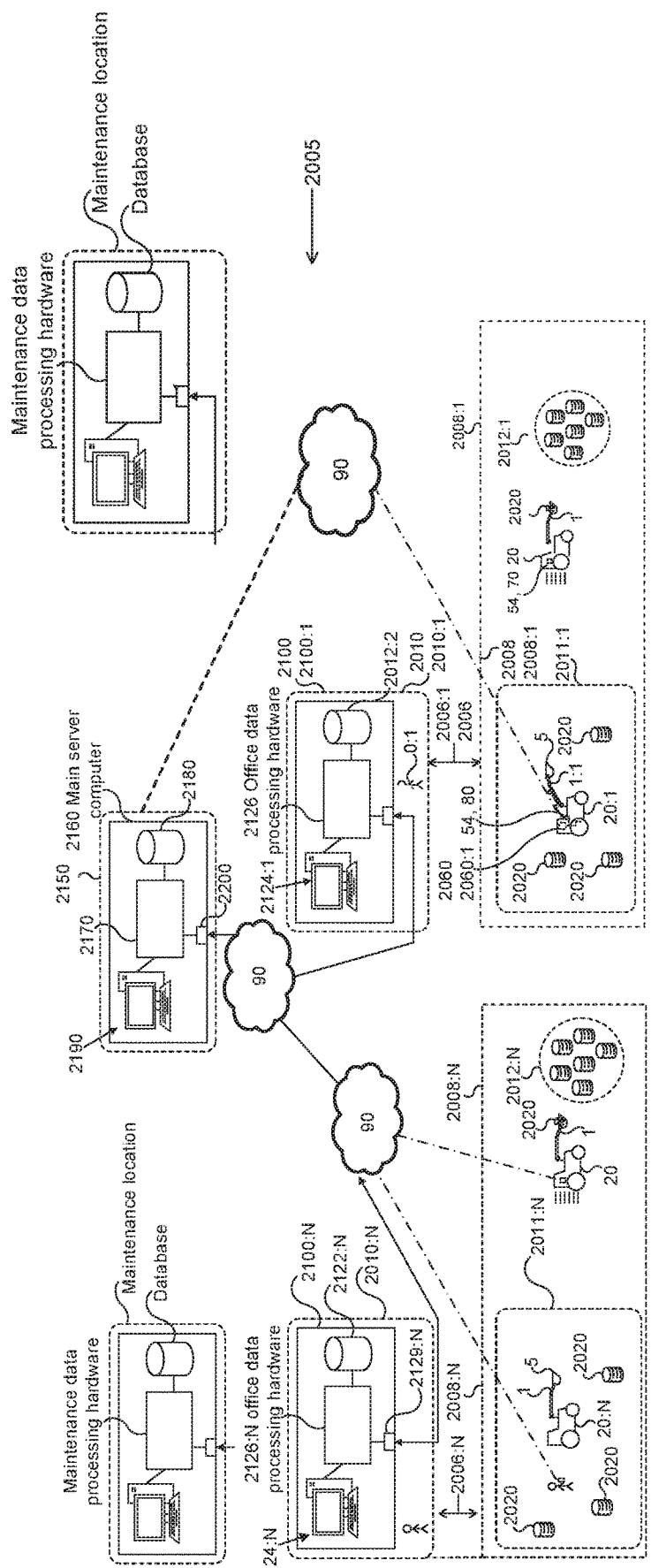
FIG. 11 shows an example of a schematic block diagram of an agriculture system.

The processor 97 may be arranged to generate an alert upon reception or generation of the status indicator. The alert may indicate that maintenance/service/inspection is due. This information may be transmitted to the electronic user device for planning or to a maintenance location form planning of maintenance FIG. 11 shows an example of a schematic block diagram of an agriculture system 2005 in which the agriculture operation monitoring system as disclosed herein may be implemented. Reference numeral 2006:1 relates to a first agriculture unit comprising an agriculture farming location 2008:1 and an agriculture office location 2010:1. The agriculture farming location-2008:1 may comprise a first source location 2011:1. The first source location 2011:1 may be a first field 2011:1, which may for example be used for growing hay. The first source location 2011:1, which may be a first field 2011:1, may be a geographical place from where items 2020 need to be collected for movement to a first target location 2012:1. The agriculture system 2005 may comprise one, two, three or a large number of agriculture units 2006:1, 2006:2, 2006:3, 2006:4 . . . 2006:N; wherein N is a positive integer. For the purpose of simplicity FIG. 8 illustrates only a first agriculture unit 2006:1 and an N:th agriculture unit 2006:N.

An item 2020 may a product 2020 to which an economic value may be associated. Accordingly, an item 2020 may a product 2020 obtained at the first source location 2011:1. Thus, for example, an item 2020 may be a bale of hay 2020. Accordingly, the first source location 2011:1 may be a first field where hay has been grown, and the items 2020 may be bales of hay 2020 harvested from the first field 2011:1. Thus, the amount of hay comprised in all of the bales of hay 2020 harvested from the first field 2011:1 during a growth season may be representative of the productivity of the first field 2011:1. According to an embodiment, the amount of hay comprised in all of the bales of hay 2020 harvested from the first field 2011:1 during a growth season may be counted as a number of bales collected from the first field 2011:1. According to another embodiment, the amount of hay comprised in all of the bales 2020 harvested from the first field 2011:1 during a growth season may be counted as the total weight of hay in all the bales collected from the first field 2011:1. Thus, the amount of hay may be counted as a number of kilograms of hay.

A work vehicle 20 is schematically shown on the first field 2011:1. The work vehicle 20 on the first field 2011:1 is associated with the first agriculture unit 2006:1, and therefore this work vehicle 20 may also be referred to by reference numeral 20:1. Similarly, other reference numerals in this disclosure may be provided with ":1" or ":N" to indicate association with the first agriculture unit 2006:1 or the N:th agriculture unit 2006:N, respectively.

The work vehicle 20:1 has an implement 1:1 attached thereto, and the implement 1:1 may carry a tool 5, 5:1. The tool 5:1 may, for example, be a gripper 5A:1 for lifting and transporting items 2020, such as bales of hay, from the first source location 2011:1 to the first target location 2012:1. The first target location 2012:1 may be a position from where the items are delivered from the first agriculture unit 2006:1 and/or from the first agriculture farming location 2008:1. Thus, the first target location 2012:1 may be a produce delivery position 2012:1. The first target location 2012:1 and/or the produce delivery position 2012:1 may be embodied by a barn for temporary storage of the items 2020, or it may be the loading area of a truck for transporting the collected items 2020 away from the first agriculture unit 2006:1 and/or from the first agriculture farming location 2008:1

An electronic user device 54 comprises a digital port 70 for receiving and/or transmitting digital signals. The digital port 70 may be adapted for bidirectional digital communication with the communication port 48 of the implement 1. The electronic user device may comprise the first digital port 70 adapted for bidirectional digital communication with the digital port 48 of the implement 1, and a second digital port 80 which is connectable to a communications network 90. The communications network 90 may include the worldwide internet, also known as the Internet. The communications network 90 may also, or alternatively, include a public switched telephone network.

With reference to FIG. 8, the communications network 90 is schematically illustrated as three interconnected clouds. It is to be understood, however, that this is just for the purpose of providing a simplified illustration of the communications network/Internet 90. The communications network/Internet 90 could also have been illustrated by a single cloud. An electronic user device in the form of an office computer 2100 at the agriculture office location 2010:1 may be connectable to the communications network/Internet 90.

The office computer 2100 may comprise a database 2122, user input/output interfaces 2124 and data processing hardware 2126, and communications port 80 for connection to the communications network/Internet 90. The office computer 2100 may be located at the agriculture office location 2010:1, which is geographically separate from the agriculture farming location 2008:1. The agriculture office location 2010:1 may be at just a short geographical distance from the agriculture farming location 2008:1. Alternatively, the agriculture office location 2010:1 may be in a in a first town, and the agriculture farming location 2008:1 may be on the countryside near another town.

The office computer 2100 may comprise software, installed on the data processing hardware 2126, for communication with the second digital port 80 of the user interface 55 and/or for communication with the digital port 48 of the implement 1.

According to an embodiment of the disclosure a main location 2150 comprises a main server computer 2160 having data processing hardware 2170 and software for surveying a plurality of implements 1 and/or work vehicles 30 at the agriculture farming location 2008:1. The main server computer 2160 may comprise a main database 2180, main server computer user input/output interfaces 2190, and a main communications port 2200 connectable to the communications network/Internet 90. The main location 2150 may be separated from the first agriculture unit 2006:1 by a geographic distance.

The main server computer 2160 may also include data processing hardware 2170 and software for communicating with the office computer 2100:1 at the agriculture-office location 2010:1 via the communications network/Internet 90.

According to a preferred embodiment, the main location 2150 comprises a main server computer 2160 having data processing hardware 2170 and software for surveying a plurality of implements 1 and/or work vehicles 30 at a plurality of agriculture farming locations 2008:1, 2008:2, 2008:3, . . . , 2008:N. According to a preferred embodiment, the main server computer 2160 may also include data processing hardware 2170 and software for communicating with a plurality of office computers 2100:1, 2100:2, 2100:3, . . . 2100:N at a plurality of agriculture office locations 2010:1, 2010:2, 2010:3, . . . 2010:N via the communications network/Internet 90.

A supplier company may operate at the main location 2150. The supplier company may sell and deliver implements 1 and/or tools 5 and/or work vehicles 30. The supplier company may also sell and deliver software for use in a controller of an implement 1, and/or software for use in an electronic user device, and/or software for use in an office computer 2100. Such software may be delivered by transmission over said communications network 90.

The electronic user device 54 may form a portable apparatus, such as a smartphone, which may be connected to the communications network 90 from time to time. As mentioned above, the electronic user device may also form a computer such as the office computer 2100.

The electronic user device 54 is connected to the communications network 2018 substantially continuously. Hence, the electronic user device may substantially always be on line available for communication with the supplier computer office data processing hardware 2126 and/or with the main server computer 2160.

A maintenance location may be arranged to receive data over the network 90 for example from the main location related to data for user when carrying out service events.

Application Example 1—Hydraulic Accumulator of Suspension System

Front loaders on agricultural tractors are commonly used to handle and transport heavy loads in agricultural industry. In particular, they are commonly used lifting and transporting load in uneven terrain, for example when moving bales from one location to another.

When driving in uneven terrain, particularly at higher speeds, generates a lot of motion on the complete vehicle that is caused by dynamic forces acting on a heavy load object in the far end of the vehicle. This in turn generates pitch and heave motions of the vehicle.

Particularly pitch motions are known to be harmful for the driver. More specifically this may cause fatigue and injuries in neck and shoulders with long time exposure. Further, such motions also induce high stress on the equipment that reduces the lifetime on the components.

To overcome such problems, front loaders are commonly equipped with a suspension system that allows some flexing between the tractor and the front loader arm. Typically this is solved by adding some accumulators in the hydraulic circuits to the lift cylinders for the loader arm.

The benefits of a load suspension systems are (i) reduced risk of work related fatigue or injuries, (ii) increased lifetime of the equipment, and (iii) higher productivity as the driver can increase speed. For same reasons it is of high importance to keep the full functionality of the suspension over the lifetime of the loader.

Unfortunately, hydraulic actuators are not stable over time. Thus, the performance of the suspension will degrade over time, and eventually there will be complete loss of functionality. To counteract this, the suspension can be maintained. Such maintenance can be reactive—when the user notice a degradation, or failure, in the performance in the function, then the system is maintained.

The objective here is to suggest a still better approach is to implement functions that that determine the need for maintenance, based on smart adaptive Status Indicators, based on the actual usage of the product and then give a maintenance reminder before the functionality have degraded to an unacceptable level.

This has been solved for an implement comprising a suspension system including a hydraulic accumulator. The local control element of the implement may then be arranged to determine a status indicator related to an operational status of the hydraulic accumulator.

The hydraulic accumulator status indicator may comprise a hydraulic accumulator maintenance indicator related to maintenance of the hydraulic accumulator determined based on a time count. The maintenance of the hydraulic accumulator may involve recharging a gas pressure of the hydraulic accumulator.

The hydraulic accumulator status indicator may instead or in addition thereto comprise a hydraulic accumulator service indicator related to replacement of the hydraulic accumulator based on a determined pressure cycle count.

Methods for monitoring the suspension system having a hydraulic accumulator is described more in detail in the following.

The predominant type of accumulators for loader suspensions are bladders accumulators. Bladder accumulators are hydro-pneumatic accumulators with a flexible bladder as a separation element between a compressible gas cushion and the operating fluid. The compressibility of a gas is utilized for storing fluids. Bladder accumulators are based on this principle, characteristically using nitrogen as the compressible medium. A bladder accumulator consists of a fluid section and a gas section with the bladder acting as the gas-proof screen. The fluid around the bladder is connected to the hydraulic circuit so that the bladder accumulator draws in the fluid when the pressure increases and the gas are compressed. When the pressure increases, the compressed gas is compressed in volume and allows fluid from the hydraulic circuit into the accumulator.

Figure 14:
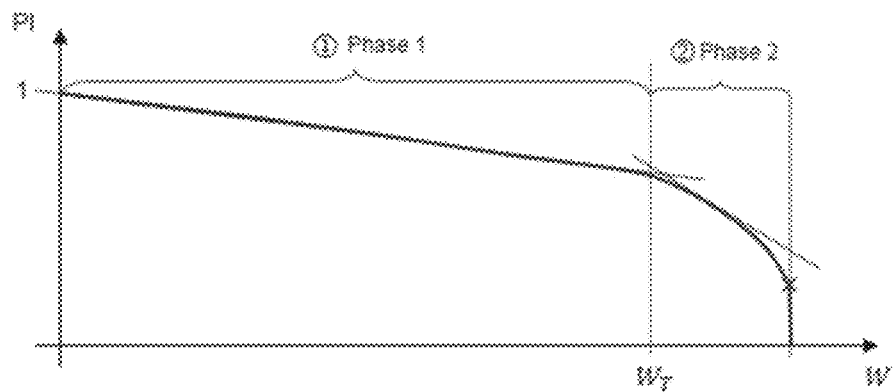
FIG. 14 is a graph illustrating a determination of a cumulative damage threshold of a suspension system.

FIG. 14 shows typical suspension performance over time for the implement. There are two characteristic phases (i) a first phase of stable degradation of performance and (ii) an accelerated phase of degradation.

Status Indicator for Re-Charging Gas Pressure

In Phase 1, the predominant mechanism of degradation of function, is loss of pre-charge pressure in the accumulator. The bladder is not a perfect seal to contain the gas. A small amount of gas will leak trough the membrane, due to gas diffusion, and the pre-charge pressure decrease over time. During this phase the pre-charge pressure can typically decrease at a rate of approximately 3-4% per year. As the pre-charge decreases the accumulator can no longer accumulate the same volume of hydraulic fluid for a pressure increase in the hydraulic lines, causing the suspension function deteriorate with time.

A small degradation of suspension function is generally acceptable, but before the functionality has worsened to a critical level the implement should be serviced by re-charging the gas pressure of the accumulator, to restore the performance. We next form a state parameter for that maintenance measure.

As pre-charge pressure is decreasing at a practically constant rate we define a present setting as:

$$W_{PS} = CT$$

Where CT is a calendar time counter. When the calendar time counter reaches a threshold, $W_T$, the accumulator is due for re-charging gas pressure. Accordingly, a status indicator is generated when the state parameter W reaches a predetermined value, which is dependent on the threshold. Accordingly, a status indicator may be generated when for example 85% or 100% of the threshold has been reached.

The threshold value can for example be determined experimentally in advance. First step is to determine how the performance of the suspension changes when the pre-charge pressure changes, and find the minimum pre-charge pressure at with acceptable performance. Then this value, together with the pre-charge loss rate of the accumulator will give the calendar time interval, i.e. $W_T$. Not all gas accumulators are re-chargeable. I such case, the maintenance measure would be to replace the accumulator when the state parameter has reached $W_T$.

Status Indicator for Accumulator Replacement

In Phase 1 there is a notable acceleration of the degradation of suspension performance. The underlying cause is that the bladder of the accumulator also wears over time. The repeated expansions and contractions of the bladder will fatigue the material. Initially causing small micro cracks in the bladder material. With continued pressure cycling, it will eventually come to a point where the bladder rupture and the suspension will lose its entire function.

The Status Indicator to replace accumulators is related to fatigue of the bladder in the accumulator, caused material stress cycling in the bladder going through repeated expansion and contractions, caused by pressure cycling. With time it will eventually come to a point where the bladder rupture and the suspension will lose its entire function. However, before a complete failure is reached, there is a Phase in the suspension lifecycle where there is an accelerated pre-charge loss due to wear and micro cracks in the bladder. It is desirable to design a status indicator making sure that the accumulator is exchanged before we enter into that Phase. As the basic mechanism is fatigue of the bladder material, cumulative damage theories may be used for forming such a status indicator.

Figure 12:
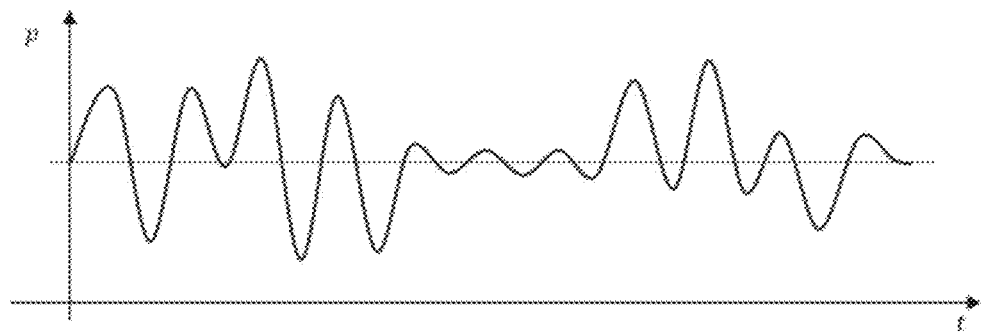
FIG. 12 is a graph illustrating an example of a record of a hydraulic pressure p in an inlet line when a suspension is working.

FIG. 12 shows a typical record of the hydraulic pressure p in the inlet line when the suspension is working. Each time the pressure is rising, the bladder will be compressed and more oil is flowing into the accumulator. Similarly, each time the hydraulic pressure is reduced the bladder will expand and oil will flow out of the accumulator. It is easily understood that this will cause corresponding stress cycling in the material of the bladder, and it is those stress cycles that causes the fatigue of the bladder material.

For prediction of the failure of the accumulator, with respect to fatigue, the well-known rule of Palmgren-Mimer may be applied. Further it can be understood that it is not necessary to know the actual stresses in the rubber bladder, as their amplitudes are directly related to the amplitudes of the hydraulic pressure amplitudes.

The Palmgren-Miner linear damage hypothesis, states that where there are M different stress magnitudes in a spectrum, $S_i$ (i=1, 2, ..., M), each contributing $n_i(S_i)$ cycles, then if $N_i(S_i)$ is the number of cycles to failure at cycling with constant stress amplitude, $S_i$, then failure occurs when the cumulative damage ratio $$C = \sum_{i=1}^{M} (n_i / N_i) = 1$$

Introducing the cumulative damage work as, $$w = \sum_{i=1}^{M} n_i S_i,$$

and failure can be expected to occur when $w = \sum_{i=1}^{M} N_i S_i$.

Given at pressure data record, there are several algorithms for cycle counting, i.e. determining amplitudes $P_i$ and the number or cycles $n_i$ for each amplitude. One of the most known is that rainflow counting method, which is also available versions for realtime analysis. This, make it easy for implementation into an embedded system for real time calculation of cumulative damage.

Figure 13:
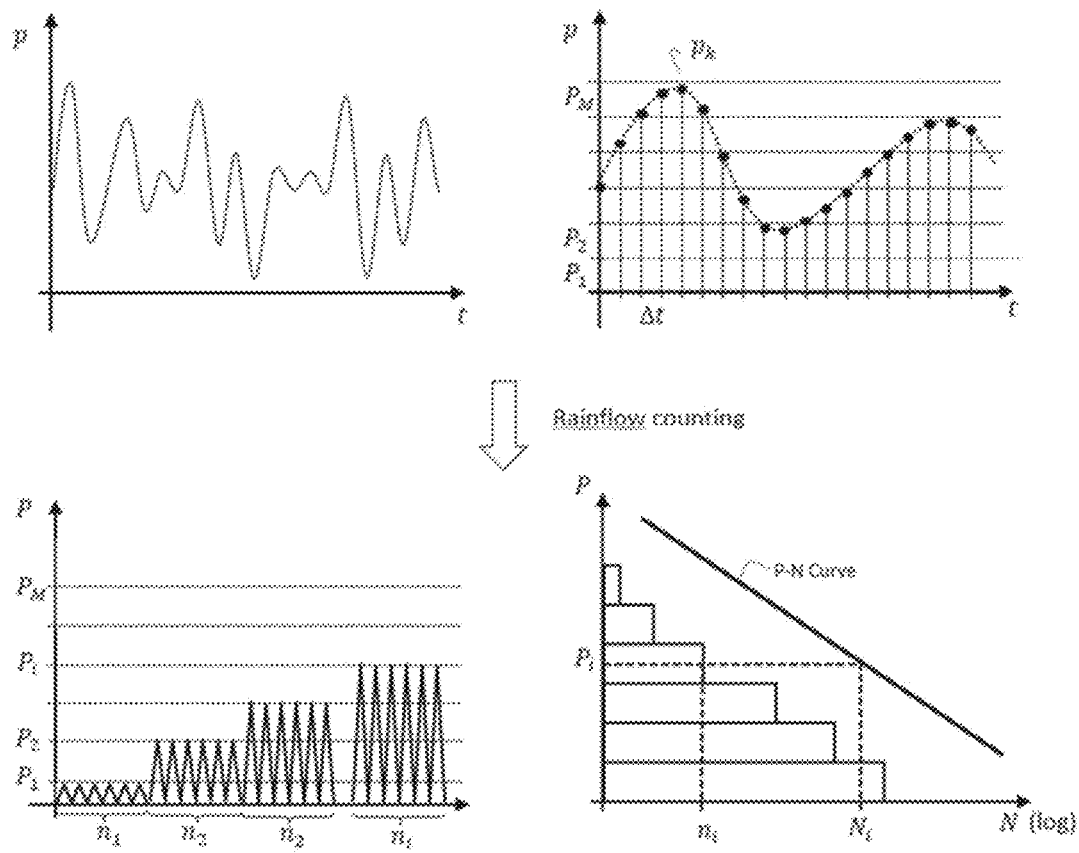
FIG. 13 are graphs illustrating an example of a flow for performing a pressure cycle count on a record as disclosed in FIG. 9.

FIG. 13 illustrates that the variable pressure p(t) at the hydraulic line, can be digitalized by sampling at a sampling interval, Δt, and by placing each value In a pressure class $P_i$. The rain flow counting algorithm, can then be applied to the data record, $p_k$ for k=1, 2, ..., M, where M is the number of samples. The rainflow counting then give us the number of pressure cycles $n_i$ for each pressure class, $N_i$, for i=1, 2, ..., M where M is the number of pressure classes.

Assuming proportionality between hydraulic pressure and strain we can then express a parameter counter for the present setting $W_{PS}$ as:

$$W_{PS} = \sum_{i=1}^{M} n_i P_i$$

Where $n_i$ is the number of accumulated pressure cycles at pressure amplitudes $P_i$. Thus we use this state parameter, as a counter for accumulator replacement. When this a counter has reached the threshold, $W_T$, for accumulator replacement it is due for replacement and/or inspection. Accordingly, a status indicator is generated when the present setting $W_{PS}$ reaches a predetermined value, which is dependent on the threshold. Accordingly, a status indicator may be generated when for example 85% or 100% of the threshold has been reached.

The threshold value $W_T$ can for example be determined experimentally in advance. Test may be exposed in cycle test cycle tests to continuous load variation, until accumulator failure. During the tests we may measure the suspension and determine the state parameter. From this we could identify the transition from phase 1 to phase 2, as shown in FIG. 14. The present setting, $W_{PS}$, at this transition may be used to represent the threshold value pressure. First step is to determine how the performance of the suspension changes when the pre-charge pressure changes, and find the minimum pre-charge pressure at with acceptable performance. Then this value, together with the pre-charge loss rate of the accumulator will give the calendar time interval, i.e. $W_T$.

The computational procedure may be executed the following steps:
1: Sample pressure p(t) in and fill buffer $p_k$ for k=1, 2, ..., K where K is the buffer size
2: Perform rain flow counting on $p_k$ and identify pressure cycle distribution $P_i$, $n_i$ for i=1, 2, ..., M where M is number of pressure classes.
3: Calculate present setting increment, $\Delta W_{PS} = \sum_{i=1}^{M} P_i n_i$.
4: Update the present setting as $W_{PS} := W_{PS} + \Delta W_{PS}$
5: Check for maintenance need: if for example $W_{PS} \geq W_T + W_{LS}$ (where $W_{LS}$ is the counter value at last service) then a status indicator may be generated.
6: Repeat from step 1.

Other pressure counting methods than the rainflow counting may be used. For example, a pressure counting method can be used where amplitude peaks are counted in the sampled pressure.

Application Example 2—Structure Elements and Hoses

The local control element is arranged to form a hose and/or a structure element status indicator related to replacement/maintenance/inspection of at least one hose and/or structure element of the implement. The term inspection includes a visual inspection for example for cracks in the structure element occurring due to fatigue of the material.

The at least one structure element which may be monitored is for example an arm, a fastening element or a bearing box.

The status indicator related to replacement/maintenance/inspection of the at least one structure element of the implement is formed based on a determined pressure cycle count and possibly also on a time count.

For example, the status indicator related to replacement/maintenance/inspection of the at least one structure element of the implement may be based primarily on a pressure cycle count and secondarily on a calendar time. Especially in case the structure element is a loose movable part, such as a hose, the status indicator may also be based on a time in motion count.

In different embodiment, the local control element is arranged to form a status indicator related to replacement/maintenance/inspection of at least one hose of the implement. The status indicator related to replacement/maintenance/inspection of the at least one hose of the implement may be formed based on a determined pressure cycle count and possibly based on the time count.

The principles set out for determining a threshold value for a status indicator in example 1 based on a pressure cycle count may in analogy be used for determining threshold values for service events related to at least one structure element and/or at least one hose.

Accordingly, the pressure cycle count thresholds may be determined by

The computational procedure may be executed the following steps:
1: Sample pressure p(t) in and fill buffer $p_k$ for k=1, 2, ..., K where K is the buffer size
2: Perform rain flow counting on $p_k$ and identify pressure cycle distribution $P_i$, $n_i$ for i=1, 2, ..., M where M is number of pressure classes.
3: Calculate present setting increment, $\Delta W_{PS} = \sum_{i=1}^{M} P_i n_i$.
4: Update the present setting $W_{PS} := W_{PS} + \Delta W_{PS}$
5: Check for maintenance need: if for example $W_{PS} \geq W_T + W_{LS}$ (where $W_{LS}$ is the counter value at last service) then a status indicator may be generated.
6: Repeat from step 1.

Application Example 3—Bearings

An implement attached to a work vehicle and possibly a working tool has characteristically bearings such as radial plane bearings In accordance with an example, the local control element may be arranged to form a bearing status indicator related to maintenance/replacement of at least one bearing of the implement.

The bearing status indicator relating to maintenance of the at least one bearing may be formed based on of the time count related to the at least one bearing.

Below follows a detailed example of thresholds used for monitoring of bearings.

At least some of the following strategies for bearing maintenance are suggested.

TABLE 1 bearing maintenance

| Service event type | Status indicators |
|---|---|
| Lubricate Bearings | Power time |
| | Time in Motion |
| Replace Bearings | angular motion velocity count and cylinder pressure count |
| | Calendar time |

Status Indicator for Bearing Replacement

Dimensional wear of a radial plain bearing is expressed as $$h^B = K_D \int P^B ds$$

where $P^B$ is a bearing pressure, s is a slide distance, and $k_D$ a wear rate coefficient. The integral in this model represents the accumulated friction energy between the sliding surfaces in the bearing.

For the loader we may measure the lift cylinder pressure, p(t), and angular speed, ω(t), and angle θ(t) of the arm at the bearing pivot. Further those signals are digitalized when measured, with a sampling interval Δt. At time $t_k$, we have the corresponding measured values $p_k$, $ω_k$, and $θ_k$.

Figure 15:
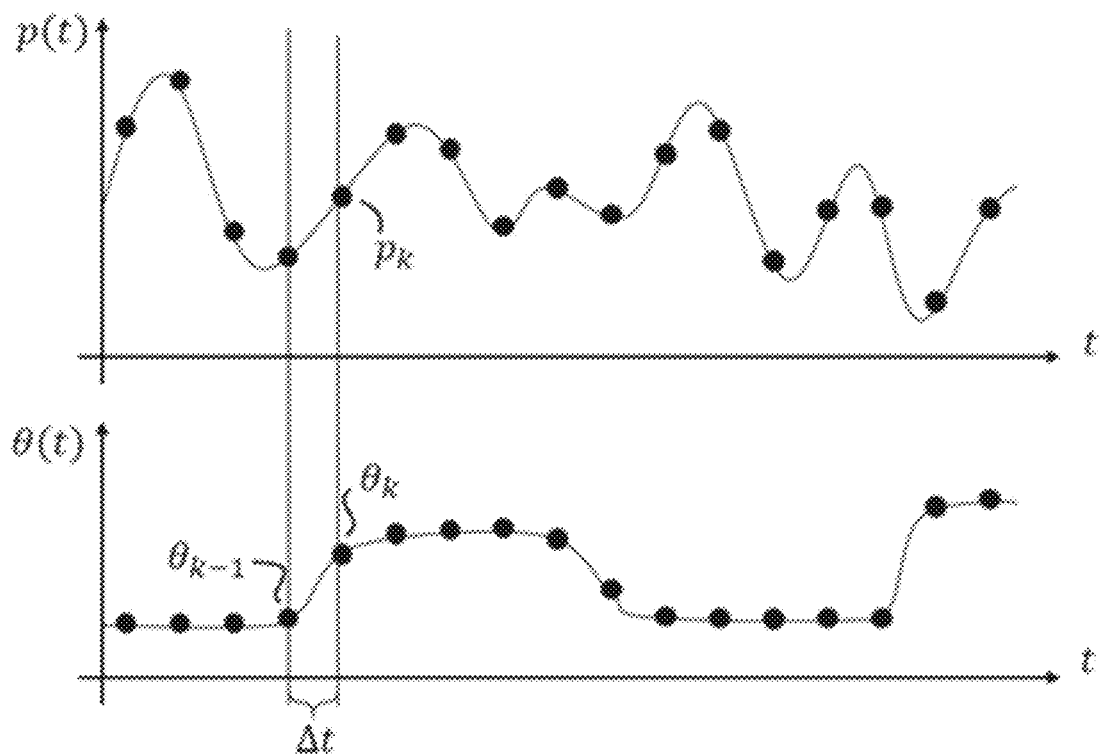
FIG. 15 are graphs illustrating an example of measuring of two types of sensor signals in relation to a bearing.

In FIG. 15, graphs illustrate an example of digitalization of the lift cylinder pressure, p(t) and angle θ(t). The lift cylinder pressure, p(t) may represent a lift cylinder pressure in a cylinder arranged to lift the arm. The lift cylinder pressure, p(t) may represent a cylinder pressure in a cylinder arranged to tilt the tool. The angle θ(t) may represent a rotational position of the arm of an implement in relation to a work vehicle. The angle θ(t) may represent the rotational position of the tool in relation to the implement.

Following the above equation, the present setting $W_{PS}$ may be estimated by the relation $$W_{PS} = \Sigma_k h_k p_k ω_k \Delta t$$

Where $h_k$ is calculated from a transfer function, h(θ), that is known for the implement and dependent on cylinder and implement geometry, through the relation $h_k = h(θ_k)$. The summation in this example extends over all time samples.

The damage work function above may be used directly as a state parameter for monitoring need of bearing replacement and/or inspection.

As has been discussed previously, when a counter has reached the threshold for bearing replacement they are due for replacement and/or inspection. Accordingly, a status indicator is generated when the state parameter W reaches a predetermined value, which is dependent on the threshold. Accordingly, a status indicator may be generated when for example 85% or 100% of the threshold has been reached.

For computational efficiency some further simplifications to the damage work function above may be made.

The weighing coefficients, $h_k$, are fully computable from the geometry function h(θ). This function may be considered to be known for each implement model. The geometry function h(θ) may be determined from the implement kinematic model. However, for further simplification and saving computational work, it may be assumed that $h_k$ is constant. For small parts of a lift cycle, that assumption is not correct, but for a large collective of data, the error averages out.

Further the pressures, $p_k$, may be divided into N number of classes (or bins) with class values $P_i$, i=1, 2, . . . , N. In the same manner may the angular speed, $v_k$, be divided into M number of classes with class values $V_j$, j=1, 2, . . . , M. Each new sample combination $p_k$ and $ω_k$, is sorted into corresponding class (i, j) where they occur depending on their values. Further the frequency of occurrences is counted in each class at multiply by Δt, forming N×M number of class amplitude values $T_{ij}$ (i=1, 2, . . . N and j=1, 2, . . . M). Then $T_{ij}$ represent the accumulated time within each class. This process correspond to forming a two dimensional histogram from the values $P_i$ and $V_j$.

Figure 16:
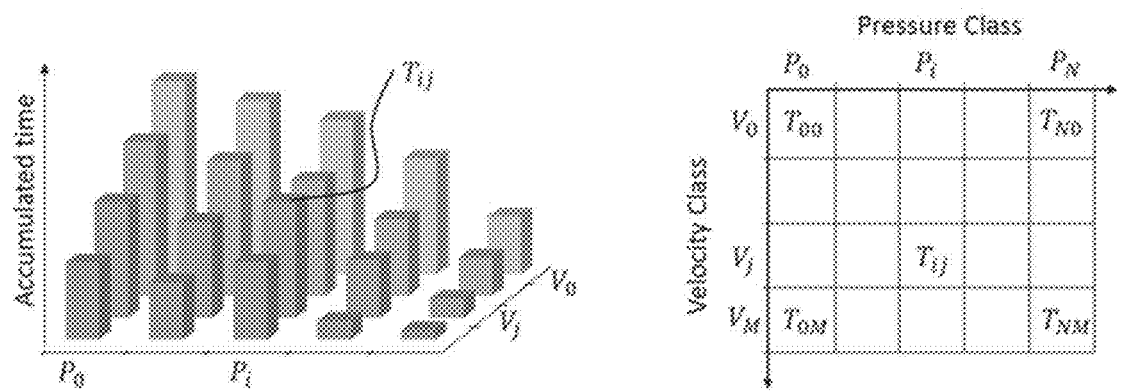
FIG. 16 illustrates a process described with a corresponding two dimensional histogram.

FIG. 16 discloses two dimensional histograms illustrating the result of this process.

The present setting $W_{PS}$ may in accordance with this process be expressed in an alternative form:

$$W_{PS} = \Sigma_{i=1}^N \Sigma_{j=1}^M P_i V_j T_{ij}$$

This algorithm may be used as a state parameter, or counter may be used for monitoring need of bearing replacement and/or inspection. When this state parameter has reached the threshold for bearing replacement they are due for replacement and/or inspection.

It should be noted that if angular velocities are not measured we may use the differentiation of the measured angles $ω_k = |θ_k - θ_{k-1}|/\Delta t$ The on-line computational procedure be executed by the following steps:

1: Sample pressure signal p(k) and motion signal θ(t), and fill buffers $p_k$ and $θ_k$, for k=1, 2, . . . , K, where K is the buffer size
2: Calculate angular speed $ω_k = |θ_k - θ_{k-1}|/\Delta t$ k=1, 2, . . . , K and fill buffer
3: Sort each data pair, $p_k$ and $ω_k$ (k=1, 2, . . . , K), according to their matching class (i,j) corresponding to the class values, $P_i$ and $V_j$. Count the number of occurrences within each class, and scale buy multiplication with Δt to form the update $\Delta T_{ij}$ (i=1, 2, . . . N and j=1, 2, . . . M)
4: Calculate present setting update, $\Delta W_{PS} = \Sigma_{j=1}^M P_i V_j \Delta T_{ij}$
5: Update present setting $W_{PS} := W_{PS} + \Delta W_{PS}$
6: Check for maintenance need: if for example $W_{PS} \geq W_T + W_{LS}$ (where $W_{LS}$ is the counter value at last service) then a status indicator is generated.
7: Repeat from step 1

It is understood that the simplification setting $h_k$ constant can be avoided by applying a tree dimensional approach, forming a tree dimensional histogram and extend the summation in the damage in three dimensions.

Status Indicator for Lubrication (Grasing) Bearings

It is well known that wear rate increases dramatically when a plain bearing is not lubricated. That would lead to premature failure (in faster rate than what has been described above. Therefore we formulate two status indicators for a service event type bearing greasing:

1: Time in motion
2: Power time

The rationale for the first is that the when implement is operated (in motion) is what causes the grease to age the most. The rational for the second is that even if the implement is not moving (just carried around) the bearings still would need to be re-greased with new fresh lubricant to cleanse out moisture and dirt that creeps in between the bearing surfaces.

Figure 17:
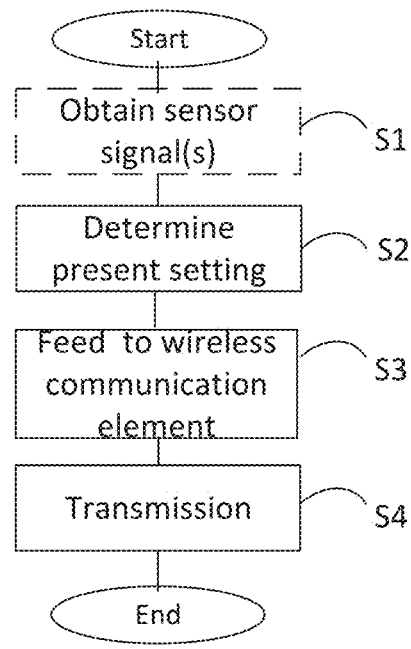
FIG. 17 is a flow chart illustrating an example of a monitoring method.

FIG. 17 illustrates a method for monitoring agriculture operation monitoring. The monitoring comprises the steps of obtaining (S1) sensor signals related to at least one hydraulic function of an implement; determining (S2) at a local control element mounted at the implement a present setting related to an operational status of the implement based on the received sensor signals; feeding (S3) a status message to a wireless communication element; and transmitting (S4) by means of the wireless communication element data related to the determined status indicator related to the operational status of the implement to a data storage and processing system or to at least one electronic user device.

We claim:

1. An agriculture operation monitoring system comprising:
   at least one implement adapted to be mounted to a work vehicle, the implement comprising:
   one or a plurality of sensors arranged to obtain sensor signals related to at least one hydraulic function of the implement;
   a first implement hydraulic connection connectable to the work vehicle by means of a corresponding first vehicle hydraulic connection; and
   a local control element;
   a wireless communication element; and
   a data storage and processing system,
   wherein when the first implement hydraulic connection is connected to the corresponding first vehicle hydraulic connection, a first hydraulic circuit controlled by means of a work vehicle mounted control valve is configured to carry hydraulic fluid to the at least one first hydraulic function,
   wherein the local control element is arranged to receive sensor signals obtained by the at least one sensor, to determine at least one present setting related to an operational status of the implement based on the received sensor signals and to feed a status message related to the present setting to the wireless communication element,
   wherein the wireless communication element is arranged to transmit the status message to the data storage and processing system or to at least one electronic user device,
   wherein the data storage and processing system or the at least one electronic user device or the local control element has access to information related to at least one threshold setting, the present setting, and a setting at last service to determine a state parameter related to the operational status of the implement based on the present setting, the threshold setting and the setting at last service event,
   wherein the data storage and processing system, or the at least one electronic user device is arranged to transmit the at least one threshold setting, information related to a last service event to the implement having an associated identity, or a combination thereof,
   wherein one of the data storage and processing system, the at least one electronic user device, and the local control element are arranged to generate a status indicator when the state parameter exceeds a predetermined value; and
   wherein a digital interface is configured to provide digital communication between the implement and the work vehicle.

2. The agriculture operation monitoring system according to claim 1, wherein at least one of the following is arranged to store historical information related to service events: the data storage and processing system, the at least one electronic user device, or the local control element.

3. The agriculture operation monitoring system according to claim 2, wherein at least one of the following is arranged to provide a status report related to a predefined implement or group of implements: the data storage and processing system or the at least one electronic user device.

4. The agriculture operation monitoring system according to claim 2, wherein at least one of the following is arranged to provide a status report related to a predefined type of service event: the data storage and processing system or the at least one electronic user device.

5. The agriculture operation monitoring system according to claim 2, wherein the data storage and processing system is arranged to receive the status message and wherein the data storage and processing system is arranged to process the received status messages from the implement to obtain an aggregated maintenance/replacement status report of all or a subset of the plurality of implements.

6. The agriculture operation monitoring system according to claim 5, wherein the electronic user device further comprises a mobile application comprising a wireless communication element arranged to receive the status message from at least one of the implements or the data storage and processing system, and to receive the aggregated maintenance/replacement status report from the data storage and processing system.

7. The agriculture operation monitoring system according to claim 1, further comprising:
   a suspension system comprising a hydraulic accumulator, wherein the local control element is arranged to form a hydraulic accumulator present setting related to an operational status of the hydraulic accumulator, the hydraulic accumulator present setting comprising a hydraulic accumulator maintenance parameter related to at least one of the following: maintenance of the hydraulic accumulator determined based on a time count, or a hydraulic parameter service parameter related to replacement of the hydraulic accumulator based on a determined pressure cycle count.

8. The agriculture operation monitoring system according to claim 7, wherein the maintenance of the hydraulic accumulator involves recharging a gas pressure of the hydraulic accumulator.

9. The agriculture operation monitoring system according to claim 1, wherein the local control element is arranged to determine a hose or structure element present setting related to an operational status of at least one of the hose or structure element of the implement, and, wherein the present setting related to the operational status of at least one of the hose or structure element of the implement is determined based on at least one of the following: a determined pressure cycle count, or a time count.

10. An agriculture operation monitoring system, comprising at least one implement adapted to be mounted to a work vehicle, the implement comprising:
   one or a plurality of sensors arranged to obtain sensor signals related to at least one hydraulic function of the implement;
   a first implement hydraulic connection connectable to the work vehicle by means of a corresponding first vehicle hydraulic connection; and
   a local control element;
   a wireless communication element; and
   a data storage and processing system,
   wherein when the first implement hydraulic connection is connected to the corresponding first vehicle hydraulic connection, a first hydraulic circuit controlled by means of a work vehicle mounted control valve is configured to carry hydraulic fluid to the at least one first hydraulic function,
   wherein the local control element is arranged to receive sensor signals obtained by the at least one sensor, to determine at least one present setting related to an operational status of the implement based on the received sensor signals and to feed a status message related to the present setting to the wireless communication element, wherein the wireless communication element is arranged to transmit the status message to the data storage and processing system or to at least one electronic user device, wherein the local control element is arranged to determine a bearing present setting related to an operational status of at least one bearing of the implement, and wherein a digital interface is configured to provide digital communication between the implement and the work vehicle.

11. The agriculture operation monitoring system according to claim 10, wherein the bearing present setting relating the operational status of at least one bearing is determined based on an estimated friction loss, the estimated friction loss based on a combination of pressure, movement and time, and time count.

12. A method for monitoring agriculture operation monitoring, said monitoring comprises the steps of:
obtaining sensor signals related to at least one hydraulic function of an implement, the implement comprising a first hydraulic connection;
determining at a local control element mounted at the implement a present setting related to an operational status of the implement based on the received sensor signals;
feeding a status message related to the present setting to a wireless communication element;
transmitting by means of the wireless communication element the status message related to the present setting to a data storage and processing system or to at least one electronic user device; and
transmitting, from the data storage and processing system or the at least one electronic user device, the present setting, information related to a last service event to the implement having an associated identity, or a combination thereof;
wherein the implement comprises a digital interface connectable to a work vehicle having a corresponding digital interface, the work vehicle being connectable to the first hydraulic connection by means of a corresponding first vehicle hydraulic connection, such that when the first implement hydraulic connection is connected to the corresponding first vehicle connection, a first hydraulic circuit controlled by means of the work vehicle mounted control valve is configured to carry hydraulic fluid to the at least one first hydraulic function
wherein the wireless communication element is mounted to the work vehicle,
wherein the digital interface is configured to provide digital communication between the implement and the work vehicle
wherein the data storage and processing system or the at least one electronic user device or the local control element has access to information related to at least one threshold setting, the present setting, and a setting at last service to determine a state parameter related to the operational status of the implement based on the present setting, the threshold setting and the setting at last service event,
wherein one of the data storage and processing system, the at least one electronic user device, and the local control element generates a status indicator when the state parameter exceeds a predetermined value.

13. The agricultural monitoring system according to claim 1, wherein the local control element is arranged to feed the status message related to the present setting to the digital interface for further transmission to the wireless communication element, and the digital interface is configured to provide digital communication between the implement and the work vehicle.

14. The agriculture operation monitoring system according to claim 1, wherein the implement comprises at least one pressure sensor, at least one movement sensor, at least one timer connected to or arranged within the local control element, or a combination thereof.

15. The agriculture operation monitoring system according to claim 1, wherein the implement comprises a front loader.

16. The agriculture operation monitoring system according claim 1, wherein the wireless communication element is mounted at the digital interface of the work vehicle, or a communication bus connected to the digital interface.

17. The agriculture operation monitoring system according to claim 1, wherein the wireless communication element is arranged to communicate with the data storage and processing system over a communication network, the communication network comprising a mobile cellular network, the Internet, or both.

18. The agriculture operation monitoring system according to claim 1, wherein the wireless communication element is arranged to communicate with the at least one electronic user device arranged to communicate with the data storage and processing system over a communication network, the communication network comprising a mobile cellular network, the Internet, or both.

19. The agriculture operation monitoring system according to claim 1, wherein the storage and processing system, the at least one electronic user device is arranged to store the status message, or both.

20. The agriculture operation monitoring system according to claim 1, wherein the local control element is arranged to determine the present setting based on a pressure cycle count.

21. The agriculture operation monitoring system according to claim 1, wherein the local control element comprises or is connected to at least one timer and wherein the local control element is arranged to determine the present setting based on the time count.

22. The agriculture operation monitoring system according to claim 21, wherein the timer is arranged to determine at least one of the following: a calendar time, a power time of the local control element, or a time in motion count.

* * * * *